United States Patent [19]

Nagasawa

[11] Patent Number: 5,647,047
[45] Date of Patent: Jul. 8, 1997

[54] SYSTEM FOR EDITING VIDEO REPRODUCED FROM A PLURALITY OF RECORDING MEDIA AT HIGH SPEED

[75] Inventor: Fumihiro Nagasawa, Kanagawa, Japan

[73] Assignee: Sony Corporation, Tokyo, Japan

[21] Appl. No.: 355,037

[22] Filed: Dec. 13, 1994

[30] Foreign Application Priority Data

Dec. 13, 1993 [JP] Japan ................... 5-312142

[51] Int. Cl.⁶ ......................................... H04N 5/783
[52] U.S. Cl. .................................. 386/52; 386/68
[58] Field of Search .................... 358/335, 342, 358/311, 312; 360/13, 15, 33.1; 348/714; 386/52, 68, 55, 46; 369/83; 395/146; H04N 5/783

[56] References Cited

U.S. PATENT DOCUMENTS

| | | | |
|---|---|---|---|
| 4,775,897 | 10/1988 | Umemoto et al. | 358/311 |
| 5,057,932 | 10/1991 | Lang | 358/335 |
| 5,337,199 | 8/1994 | Arai et al. | 360/15 |
| 5,341,178 | 8/1994 | Ebihara et a. | 358/335 |
| 5,363,264 | 11/1994 | Cavanaugh | 358/335 |
| 5,392,164 | 2/1995 | Takahashi | 358/335 |
| 5,440,432 | 8/1995 | Aoki | 360/15 |
| 5,493,414 | 2/1996 | Inoue et al. | 360/33.1 |

FOREIGN PATENT DOCUMENTS

| | | |
|---|---|---|
| 0213600 | 3/1987 | European Pat. Off. . |
| 0308120 | 3/1989 | European Pat. Off. . |
| 0544299 | 6/1993 | European Pat. Off. . |

*Primary Examiner*—Thai Q. Tran
*Assistant Examiner*—Huy Nguyen
*Attorney, Agent, or Firm*—William S. Frommer; Alvin Sinderbrand

[57] ABSTRACT

Source video media are reproduced and supplied to a storage device at high speed, that is, at n times the normal transfer rate. The storage device is preferably a random access medium, such as a disc or silicon memory. The stored source video is edited at a normal transfer rate to produce edited video which is also stored in the storage device at a normal transfer rate. The stored edited video is then transferred at n times the normal transfer rate for high speed recording on a broadcast video medium.

27 Claims, 17 Drawing Sheets

FIG. 8

SYSTEM FOR EDITING VIDEO REPRODUCED FROM A PLURALITY OF RECORDING MEDIA AT HIGH SPEED

BACKGROUND OF THE INVENTION

The present invention relates to editing of a video signal, such as a system for reproducing video from several sources, editing the reproduced video and recording the edited video signal.

Broadcasting stations have conventionally edited video from several sources, referred to as source tapes, and recorded the result, referred to as a broadcast or commercial (CM) tape, on a video tape cassette.

FIG. 1 shows an example of a conventional edit system. Video tape cassette 1 serving as the source tape is loaded into and reproduced by reproducing VTR 2. The reproduced signal is processed by digital multi-effector (DME) 7. Broadcasting video tape cassette 13 is loaded into recording VTR 8 which serves to record an output from DME 7 on the broadcasting video tape cassette 13. If special effects capabilities are not required, instead of the DME 7, an editor may be used and the reproducing VTR 2 and the recording VTR 8 may be combined.

In the reproducing-side VTR 2, a reproducing head 3 is connected to one fixed contact 5a of a head change-over switch 5, and a reproducing head 4 is connected to the other fixed contact 5b of the head change-over switch 5. The switch 5 selectively connects its movable contact 5c to one or the other fixed contact 5a or 5b based on a switching signal supplied to a VTR main body 6 from a system controller, not shown.

If the reproducing VTR 2 is either an analog VTR or digital VTR, then video and audio signals output from the reproducing VTR 2 are supplied to the DME 7 at transfer rate of 60 fields/second when the video and audio signals are NTSC signals, and are supplied thereto at transfer rate of 50 fields/seconds when the video and audio signals are PAL signals.

The DME 7 includes analog video and audio input terminals and digital video and audio input terminals. The DME 7 is adapted to perform special effect processing on the video signal from the reproducing VTR 2, such as mosaic effect, movement, reduction, magnification, rotation of image or the like, based on the transfer rate of 60 fields/seconds if the video signal is the NTSC video signal and based on the transfer rate of 50 fields/second if the video signal is the PAL video signal. An output of the DME 7 is supplied to the recording VTR 8.

The recording VTR 8 includes a recording head 9 connected to one fixed contact 11a of a head change-over switch 11 and a recording head 10 connected to the other fixed contact 11a of the head change-over switch 11. The switch 11 selectively connects its movable contact 11c to one or the other fixed contact 11a or 11b based on a switching signal supplied to the VTR main body 12 from the system controller, not shown. The recording VTR 8 is operative to record the signal output from the DME 7 on the video tape cassette 13 on the basis of the transfer rate of 60 fields/second if the video signal is the NTSC video signal and the transfer rate of 50 fields/second if the video signal is the PAL video signal.

[0011]

The same assignee of this application has previously proposed, in Japanese patent application No. 5-87413, an edit apparatus comprising display means on which first and second points of predetermined-unit image data are displayed, designating means for designating the predetermined-unit image data of the first and second points displayed on the display means and control means for displaying time code data of the first or second point image data designated by the designating means, status and identification number of associated equipment to thereby improve edit efficiency and utilization factor, e.g., edit apparatus capable of carrying out edit work without carrying out a cumbersome work, such as checking a plurality of VTRs through the reproduction and confirming and inputting memory address or the like through a keyboard or the like by changing contents of edit files EDL1 to EDLn by deleting, copying, moving and replacing edit-unit image data displayed on a picture screen, for example, by means of a pointing device or keyboard. Thus, edit work can be carried out efficiently.

The video editing system shown in FIG. 1 has several drawbacks.

Since the transfer rate for the source and broadcast video signals in FIG. 1 is determined based on the field of frame frequency of the video signal, the processes of reproducing the source video and recording the broadcast video consume more time than is necessary. Specifically, the conventional NTSC and PAL frame frequencies are determined based on human perception, whereas reproduction and recording in a video editing system need not be constrained by human perceptual rates.

If the source video is drawn from many tapes, it takes a long time to assemble these sources for use by the DME 7.

The work efficiency of the operator is particularly deteriorated when it is necessary to dub or revise, that is, again carry out processing with the DME 7, because the source video must be rewound to the original tape position and the entirety of the process of signal reproduction must be repeated.

If the source video is repeatedly reproduced, there is also the increased possibility that a precious source tape will be damaged.

When multiple recordings are made on the broadcast video tape cassette, the video cassette contains a number of edit points composed of magnetic tracks formed by the previous-recording process and magnetic tracks formed by the present recording processing. When the broadcast video tape cassette 13 having many such edit points is reproduced, there is the possibility that a picture will be disturbed at such edit point or that a reproduced picture will be influenced by the edit point.

Furthermore, if editing involves mixing and switching from multiple sources, it is necessary to increase the number of the reproducing VTRs as the number of sources increases.

OBJECTS AND SUMMARY OF THE INVENTION

Therefore, an object of the present invention is to provide a video editing system which avoids the aforementioned disadvantages of the prior art.

Another object of the present invention is to improve the efficiency of editing, such as reducing the time required for editing.

Yet another object of the present invention is to eliminate the repeated reproduction of a source video tape.

A further object of the present invention is to eliminate the influence of edit points in the broadcast video tape.

Still another object of the present invention is to improve the flexibility of the editing process.

In accordance with an aspect of this invention, the foregoing objects are met by provision of an editing method and an editing system for transferring edit information from a source at n times a normal transfer rate of the edit information, and storing the transferred edit information in storage means. Then, the stored edit information is transferred at the normal transfer rate, processed to produce processed information, and the processed information is transferred at the normal transfer rate to the storage means and stored therein. The stored processed information is transferred to a destination at n times the normal transfer rate.

It is not intended that the invention be summarized here in its entirety. Rather, further features, aspects and advantages of the invention are set forth in or are apparent from the following description and drawings.

BRIEF DESCRIPTION OF THE DRAWINGS

FIGS. 7–10 are timing charts referred to in explaining recording and reproducing by the high speed transfer machine according to the present invention;

DETAILED DESCRIPTION OF THE PREFERRED EMBODIMENTS

According to the present invention, source video media are reproduced and supplied to a storage device at high speed, that is, at n times the normal transfer rate. The storage device is preferably a random access medium, such as a disc or silicon memory. The stored source video is edited at a normal transfer rate to produce edited video which is also stored in the storage device at a normal transfer rate. The stored edited video is then transferred at n times the normal transfer rate for high speed recording on a broadcast video medium.

Because the source video is reproduced and transferred at high speed, the editing process becomes more efficient. Specifically, processing standby time is reduced to 1/n of the normal time processing standby time.

Because the source video is stored in the storage device, each source video medium need be reproduced only once, no matter how many times the source is edited, revised, dubbed and so forth.

Because the stored source video can be edited at a normal transfer rate, conventional editing equipment can be used.

Because the edited video is stored in the storage device, it can be viewed on a monitor at intermediate points in the editing process, that is, flexibility of the editing process is improved.

Because the edited video is stored before it is recorded, it is possible to reduce mistakes in connecting edited video segments and to better control positioning of the edited video.

Because the edited video is recorded only once after all editing has been satisfactorily completed, the number of edit points on the broadcast video medium is greatly reduced or even eliminated.

Because the edited video is recorded at high speed, the editing process becomes more efficient.

Therefore, when editing is performed in accordance with the present invention, it is possible to provide a satisfactory editing environment for the operator using a simple system arrangement, thereby considerably increasing edit accuracy, flexibility and efficiency.

Figure 2:
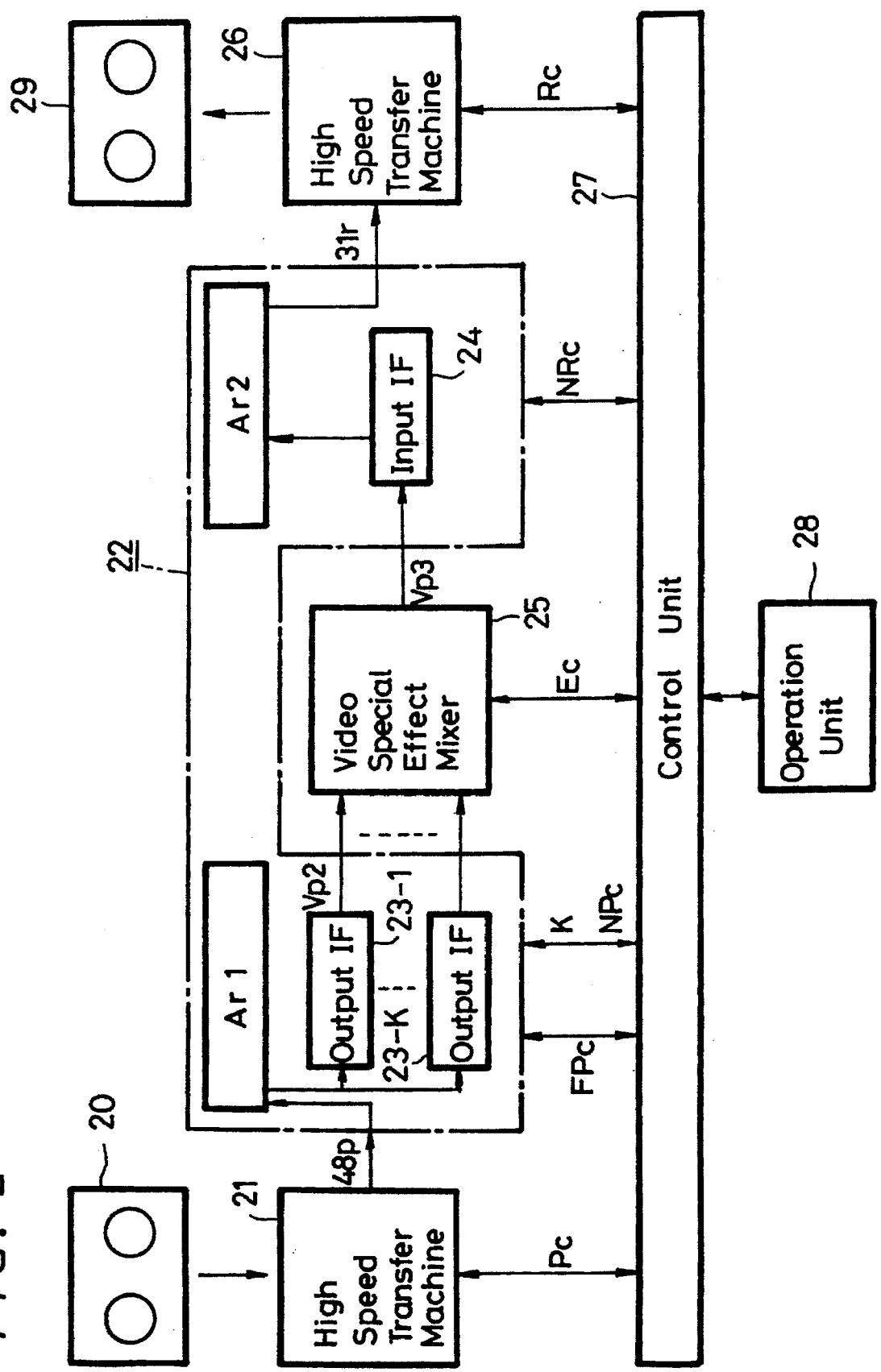
FIG. 2 is a block diagram showing an edit system according to an embodiment of the present invention.

FIG. 2 shows an editing system according to the present invention.

Source video and audio media is loaded into a high speed transfer machine 21 adapted to reproduce the source video and audio at n times the normal transfer rate, that is, to compress the time base of the source video and audio signal by a factor of n, based on a playback control signal Pc from a control unit 27. The normal transfer rate is determined by the format of the signal, for example, NTSC or PAL. The high speed transfer machine 21 may be a VTR, in which case the source video media is a video tape cassette.

The n-times normal transfer rate reproduced video and audio signal 48p, which comprises digital video and audio data but which may be analog video and audio, is supplied to a storage device 22. As the digital format, there can be utilized a variety of digital formats, such as a D1 format of component digital system, a D2 format of component digital system or formats of component or composite digital system using compression coding or the like. If the signal 48p is an analog signal, then the storage device 22 functions to convert the signal 48p into digital data.

The storage apparatus 22 is adapted to record at high speed the n times normal transfer rate reproduced video and audio signal 48p from the high speed transfer machine 21 in a recording area Ar1 based on a high speed recording and reproducing control signal FPc supplied thereto from the control unit 27.

The recording media used in the storage apparatus 22 can be an optical disc (magneto-optical disc, write-once optical disc, optical disc as phase-change media), a hard disc (stationary magnetic type hard disc or a removable hard disc that can be freely detachable), a silicon disc (that is, a semiconductor memory) or a flexible disc having a recording capacity of at least 20 MBytes. At present, it is preferred to use a hard disc which can be accessed at high speed and which is inexpensive per storage unit. However, the silicon disc is preferred when access speed is critical.

It is possible to reproduce from a plurality of sources at the same time when the area Ar1 of the storage device 22 is formed of a plurality of discs and one head, or is formed of one disc and a plurality of heads or is formed of one disc, one head and an output memory. The storage device 22 can record from a plurality of sources in the area Ar1, can reproduce one source stored in the area Ar1 or can simultaneously reproduce from a plurality of sources.

Data is supplied from the recording area Ar1 to output interface circuits 23-1, 23-2, . . . , 23-k which function to supply video and audio data transferred thereto at the normal transfer rate, such as 60 fields/second, to a video and/or audio special effect mixer 25 based on a reproduction control signal NPc supplied thereto from the control unit 27. Specifically, a plurality of sources may be simultaneously reproduced from the area Ar1 and output through the output interface circuits 23-1, 23-2, . . . , 23-k.

The special effect mixer 25 is operative to process the video and audio signals supplied thereto in accordance with an effects control signal Ec from control unit 27 based on operator input supplied through operation unit 28 to the control unit 27. The mixer 25 may be formed of, for example, a DME, a switcher and an audio mixer.

The processed video and audio data are applied at the normal transfer rate from the mixer 25 to an input interface circuit 24 of the storage device 22. Alternatively, external video and audio data may be applied to the input interface circuit 24. The input interface circuit 24 functions to apply the data applied thereto to a recording area Ar2 of the storage device 22.

On the basis controlling control signal NRc from the control unit 27, the video and audio data stored in the recording area Ar2 are supplied to high speed transfer machine 26 at n times the normal transfer rate as video and audio data 31r for recording at high speed on broadcast video medium 29. When the high speed transfer machine 26 is a VTR, the medium 29 is a video tape cassette 29.

The high speed transfer machine 26 is operative to reproduce the timebase expanded video and audio data at a normal transfer rate, e.g., 60 fields/second video and audio signals in the form of digital or analog data. When the edit system is connected to a transmission system or the like, the timebase expanded video and audio signals are supplied through a master switcher to a transmitter under the control of a control system of the transmission system, and thereby transmitted from an antenna of the transmitter as radio waves. The reproduced video and audio signals are digital video and audio data, or may be analog video and audio signals.

Though not shown, the operation unit 28 includes operation keys by which the user can directly operate the high speed transfer machines 21, 26, the storage device 22 and the video special effect mixer 25, various keys for setting a method of reading video and audio data recorded on the storage device 22 or the like, and a display unit for displaying edit information, edit menu and time codes from the high speed transfer machines 21 and 26 in the form of hour, minute, second and frame.

Operator use of the edit system of FIG. 2 will now be described.

Initially, the operator loads a video tape cassette 20 on the high speed transfer machine as source media. Thereafter, the operator searches for a source cut used in editing (one or consecutive image and audio data used as one source) by operating the operation keys and operation panel, not shown, of the operation unit 28 or the high speed transfer machine 21.

When a starting portion of the source cut or event is determined, the operator presses the operation key of the operation unit 27 or the high speed transfer machine 21 or makes a memorandum of time codes displayed on the display portion of the operation unit 28 or the high speed transfer machine 21 electrically or on some suitable means, such as a paper or the like. Similarly, when an ending portion of the source event used in the playback is determined, the operator presses the operation key of the operation unit 27 or the high speed transfer machine 21 or makes a memorandum of time codes displayed on the display unit of the operation unit 28 or the high speed transfer machine 21 electrically or on some suitable means, such as a paper or the like.

When the operator makes a memorandum electrically or presses the operation key, for example, the time codes (referred to hereinafter as "starting time code" and "ending time code") of the starting portion and the ending portion of the source cut are stored in a memory, not shown, of the control unit 27. When the operator makes a memorandum on a paper or the like, the operator enters the time code noted on the paper by operating the operation key of the operation unit 28. Using any one of the methods, the starting time code and the ending time code of the source are stored in the memory of the control unit 27.

The operator may set the tape position of the video tape cassette 20 to the source starting time code position by operating the high speed transfer machine 21 in a manual fashion. Alternatively, when the operator operates the operation key of the operation unit 28, the source starting time code position may be matched with the starting time code held by the time code supplied from the high speed transfer machine 21 at that time by rewinding or fast-forwarding the high speed transfer machine 21 under the control of the control unit 27. The time code might be a VITC (Vertical Interval Time Code) or LTC (Longitudinal Time Code).

After the starting time code and the ending time code of the source are stored in the memory of the control unit 27, when the operator operates an edit start command key, not shown, of the operation unit 28, the control unit 27 supplies the reproduction control signal Pc to the high speed transfer machine 21 and also supplies the high speed recording and reproduction control signal FPc to the storage device 22. Then, the high speed transfer machine 21 reproduces the video and audio signals recorded on the loaded video tape cassette 20 at high speed in response to the reproduction control signal Pc supplied thereto from the control unit 27. The reproduced video and audio signals are transferred to the storage device 22 at n times the normal transfer rate of, e.g., 60 fields/second, by the high speed transfer machine 21.

Therefore, the video and audio signals that had been transferred at n times the normal transfer rate are stored in the area Ar1 of the storage device 22. Alternatively, the operator may not operate the edit start command key of the operation unit 28 but may energize the high speed transfer machine in a manual operation to supply the reproduced signal to some suitable means, such as a television monitor or the like so that the reproduced signal is displayed on the picture screen of the television monitor. Then, the video and audio signal can be recorded on the storage device 22 in a manual fashion by operating the operation unit 28 while the reproduced picture is being monitored. Since the manual operation (recording is started and recording is ended) is carried out while the picture is being monitored, the transfer rate of the output from the high speed transfer machine 21 should be 60 fields/second.

Sources other than the video tape cassette 20, such as still picture sources of camera picture, graphics and audio sources of announcements, background music or the like, can be stored in the area Ar1 of the storage device 22 from an external input terminal, not shown, of the storage device 22 by operating the operation unit 28 and can be used in editing similarly to other sources. The external source and the source from the video tape cassette 20 may be recorded on the storage device 22 without order of priority.

After all sources are stored in the area Ar1 of the storage device 22, editing is carried out by using the operation unit 28, the control unit 27, the storage device 22 and the video special effect mixer 25. When the operator operates a certain reproduction pattern designating operation key of the operation unit 28, commands assigned to operation keys, e.g., various reproduction commands, such as slow motion reproduction, quick motion reproduction, etc., are supplied from the control unit 27 to the storage device 22. When commands indicative of reproducing at various reproduction speeds are supplied to the output interface circuits 23-1, 23-2, ..., 23-k of the storage device 22, the output interface circuits 23-1, 23-2, ..., 23-k of the storage device 22 output sources read out from the area Ar1 of the storage device 22 at speeds based on the commands.

The output from the storage device 22 is supplied to the video special effect mixer 25. The effect control signal Ec supplied from the control unit 27 is supplied to the video special effect mixer 25 by operating the operation unit 28 by the operator. The effect control signal Ec is used to synchronize the effect control with the transfer timing of the video and audio data output from the storage device 22.

The video and audio data are processed by the video special effect mixer 25 and are supplied to the input interface circuit 24 of the storage device 22 at a transfer rate of 60 fields/second for storage in the area Ar2 of the storage device 22.

When editing of all sources is finished, edited source, for example, is stored in the area Ar2 of the storage device 22 as one program source. When the operator operates a high speed read-out designating operation key of the operation unit 28, the high speed recording and reproduction control signal NRc is supplied from the control unit 27 to the storage device 22, whereby the source recorded or memorized in the area Ar2 of the storage device 22 is read out at high speed and transferred to the high speed transfer machine 26 at high speed. This source is then recorded on the video tape cassette 29 loaded on the high speed transfer machine 26 at high speed.

When the source recorded on the video tape cassette 29 is used as a transmission source, for example, the high speed transfer machine 26 then reproduces the video tape cassette at the normal tape transport speed in order to output the source data at the transfer rate of 60 fields/second.

Figure 3:
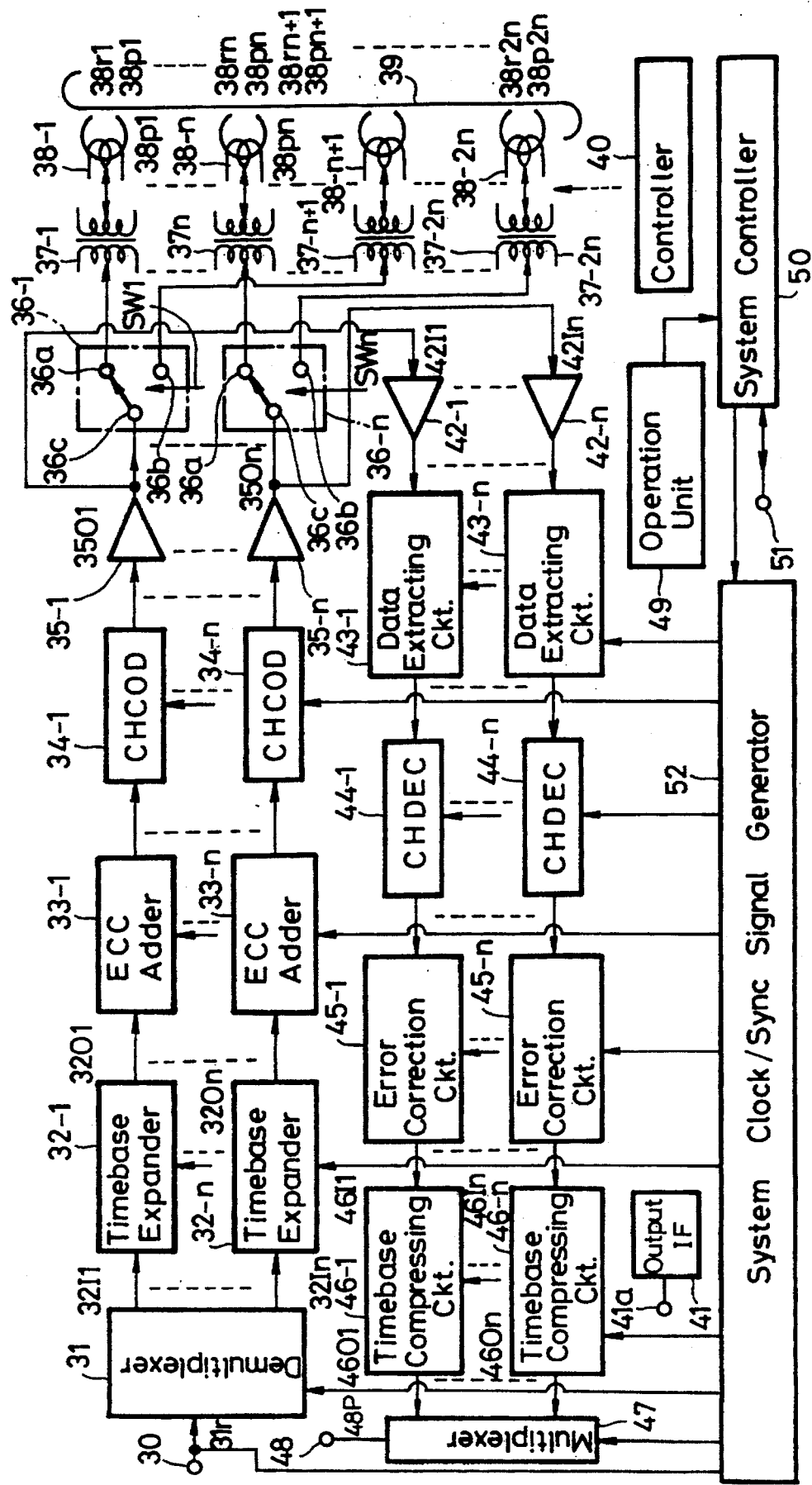
FIG. 3 is a block diagram showing an example of the high speed transfer machines 21, 26 of FIG. 2, integrated as one apparatus.
Figure 4D:
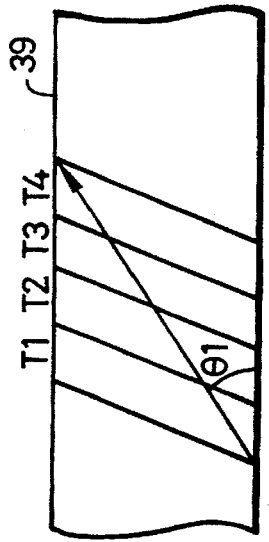
FIGS. 4A–4G are diagrams referred to in explaining the lead angle of a rotary drum in the high speed transfer machine shown in FIG. 3.
Figure 4E:
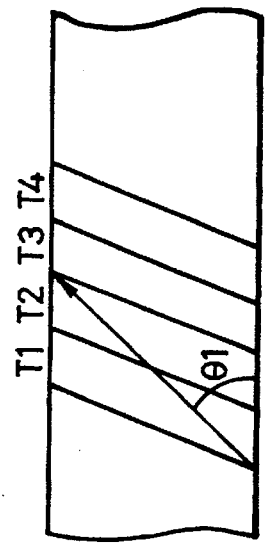
Figure 4F:
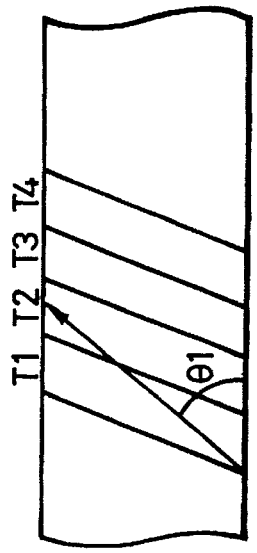
Figure 4G:
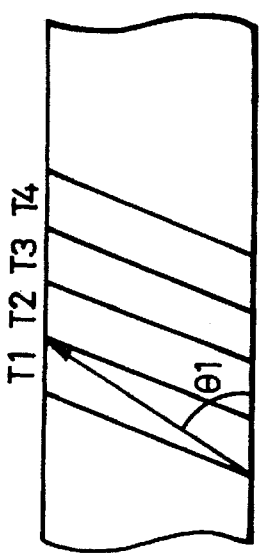
Figure 5:
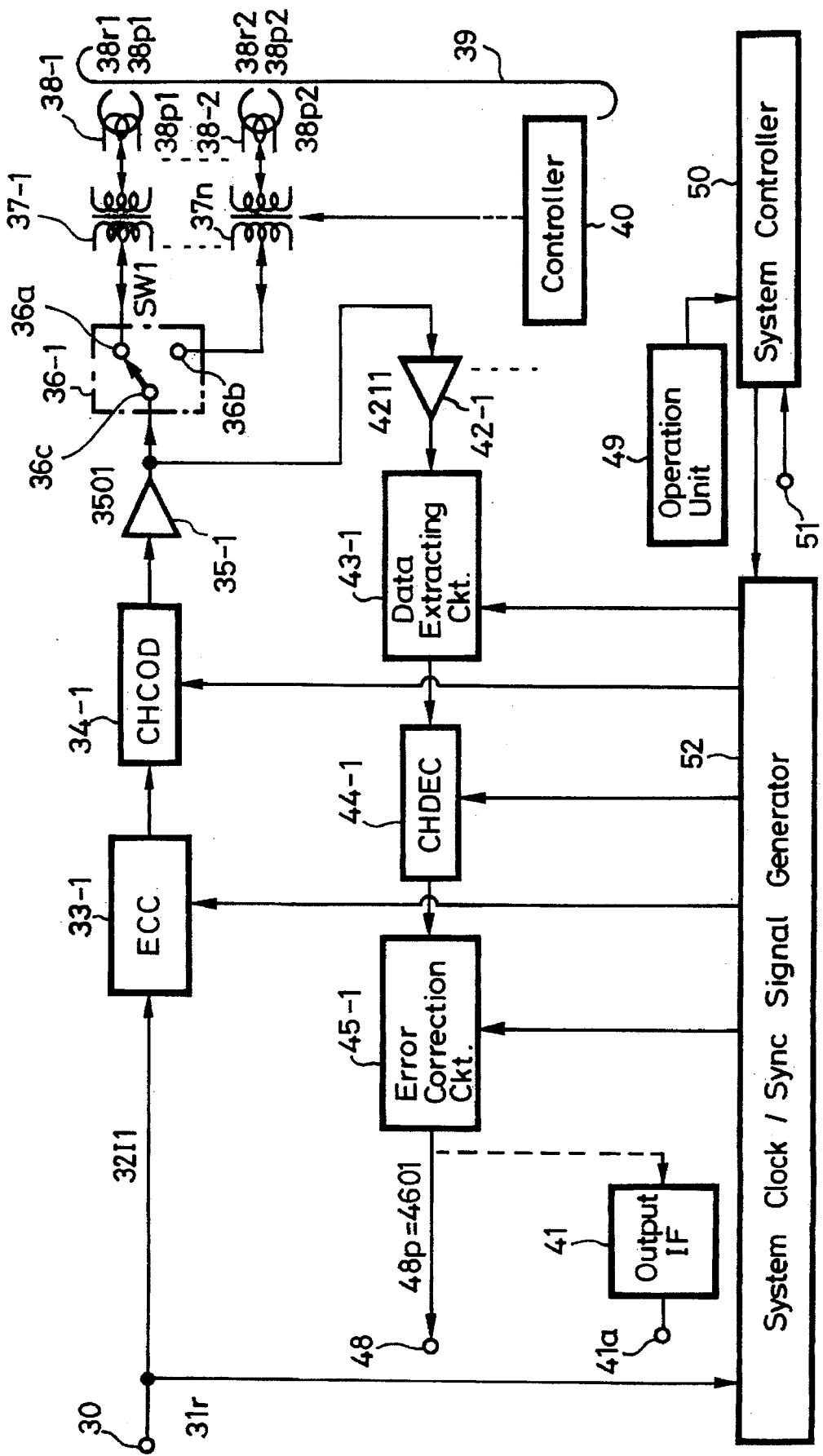
FIG. 5 is a block diagram of another embodiment of the high speed transfer machines 21, 26 of FIG. 3.
Figure 6:
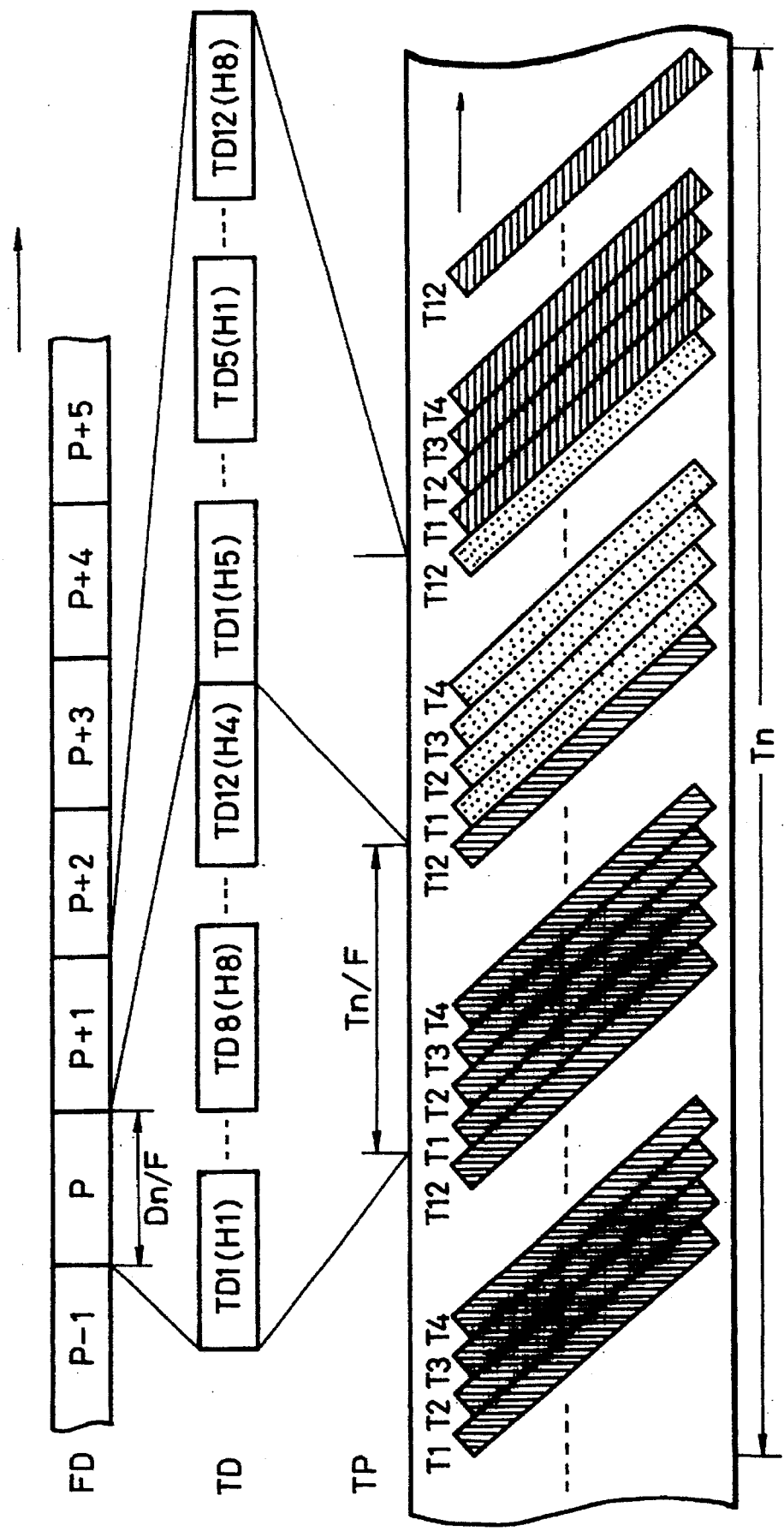
FIG. 6 is a diagram referred to in explaining a relationship between the transfer format and a recording track pattern of the recording high speed transfer machine according to the present invention.

FIG. 3 shows the high speed transfer machines 21 and 26. FIG. 4 is a chart illustrating high speed recording by the high speed transfer machine shown in FIG. 3. FIGS. 5 and 6 are timing charts respectively illustrating recording and reproducing by the high speed transfer machine shown in FIG. 3.

FIG. 3 shows the high speed transfer machines 21 and 26 as being VTRs, each capable of recording and reproducing video and audio signals. Alternatively, the high speed transfer machine 21 may comprise only the reproducing system shown in FIG. 3 and the high speed transfer machine 26 may comprise only the recording system shown in FIG. 3.

Recording by the high speed transfer machine of FIG. 3 will now be described.

Terminal 30 of FIG. 3 is an input terminal for externally supplied data if the high speed transfer machine of FIG. 3 is the high speed transfer machine 21 of FIG. 2, or is an input terminal for video and audio data 31p transferred at high speed from the storage device 22 if the high speed transfer machine of FIG. 3 is the high speed transfer machine 26 of FIG. 2.

The video and audio data 31p transferred at high speed through the input terminal 30 are supplied to a demultiplexer 31 which functions to segment and output video and audio data transferred thereto at high speed.

If the segmented data of the video and audio data thus transferred at high speed are considered as the data from the storage device 22, then the quantity of data is determined by the reproducing head of the high speed transfer machine 21, i.e., data of every track is supplied as one data row so that the video and audio data is converted into original data row, i.e., data of every track (referred to as "segment division").

Segmented data of every track are supplied from the demultiplexer 31 to timebase expanding circuits 32-1, 32-2, ..., 32-n, respectively. Each of the timebase expanding circuits 32-1, 32-2, ..., 32-n includes a dual port memory and a write/read circuit. The timebase expanding circuits 32-1, 32-2, ..., 32-n are adapted to expand the timebase of the n times normal transfer rate data by intermittently writing n times transfer rate data supplied thereto in the dual port memories and, at the same time, reading the data written in the dual port memories at the normal transfer rate.

Timebase expanded video and audio data are supplied from the timebase expanding circuits 32-1, 32-2, ..., 32-n, to error correction code (ECC) adding circuits 33-1, 33-2, ..., 33n, respectively, which add ECCs to the timebase-expanded video and audio data supplied thereto, and supply the ECC augmented video and audio data to channel coding (CHCOD) circuits 34-1, 34-2, ..., 34-n, that respectively digitally modulate the augmented data for recording.

The channel coded video and audio signals are supplied through recording amplifiers 35-1, 35-2, ..., 35-n to movable contacts 36c of switches 36-1, 36-2, ..., 36-n, respectively. Fixed contact 36a of each of the switches 36-1, 36-2, ..., 36-n is connected to a primary side of rotary transformers 37-1, 37-2, ..., 37-n, respectively, and fixed contact 36b of switches 36-1, 36-2, ..., 36-n is connected to a primary side of rotary transformers 37-n+1, 37-n+2, ..., 37-2n, respectively. Switches 36-1, 36-2, ..., 36-n connect the movable contacts 36c to one of the fixed contacts 36a and 36b based on switching signals SW1, SW2, ..., SWn supplied thereto from a system controller 50, to switch between recording/reproducing heads (38-1, 38-2 ... 38-n), and (38-n+1, 38-n+2 ... 38-2n), which function to record the signals supplied thereto on a magnetic tape 39 as slant tracks.

A tape transport unit comprising the rotary transformers 37-1, 37-2, ... 37-2n, a tape loading mechanism, not shown, and the recording/reproducing heads 38-1, 38-2 ... 38-2n is operated under the control of the controller 40.

The recording/reproducing heads 38-1, 38-2, ..., 38-n, 38-2n are mounted on a rotary drum, not shown, such that they are opposed to one another and are spaced apart with an equal distance. The recording/reproducing heads 38-1, 38-2 ... 38-2n are sequentially supplied with recording currents from the respective recording amplifiers 35-1, 35-2, ..., 35-n since video and audio data to be recorded are sequentially supplied from the channel coding circuits 33-1, 33-2, ..., 33-n to the recording amplifiers 35-1, 35-2, ..., 35-n.

Relationships between the number of heads mounted on the rotary drum, the tape transport speed, the rotational speed of the rotary drum and the lead angle of the rotary drum will now be discussed.

Initially, let it be assumed that one or a plurality of recording and reproducing heads are mounted on the rotary drum along the height direction of the rotary drum, that one or a plurality of heads arranged along the height direction form a pair and the pairs are attached on the rotary drum such that the pairs are spaced apart by an equal distance (or equal angular spacing).

Generally, when x is the number of heads to obtain a normal transfer rate, if n is a magnification factor of the normal tape transport speed, then it is sufficient that the rotary drum is rotated at the normal rotational speed. If the number of heads is reduced, the rotational speed of the rotary drum should be increased. Therefore, when the magnetic tape 39 is transported at n times the normal tape transport speed, if d is a magnification factor of the normal rotational speed of the rotary drum and h is the number of heads, the magnification factor d relative to the normal rotational speed of the rotary drum or the number h of heads is set such that hd=xn is satisfied.

Furthermore, when t is the number of conventionally formed tracks traversed during one rotation of the rotary drum having a lead angle $\theta_1$ when the tape is stopped, the rotary drum lead angle $\theta_1$ is set so the number of tracks t satisfies dt=n.

The transfer rate can be varied. Specifically, it is possible for the operator to set the transfer rate by operating the operation keys of the operation unit 28.

To obtain n times the normal transfer rate, the magnetic tape 39 is transported at n times normal tape transport speed. Assuming x represents the number of heads required in the normal transfer rate VTR, xn heads are mounted on the rotary drum and the rotary drum is rotated at the normal rotational speed. Because of the flexibility in choosing the number of recording/reproducing heads, the tape transport speed and the drum rotational speed, it is possible to reliably transfer the video and audio data at n times the normal transfer rate, thereby increasing edit work efficiency in the edit system.

To obtain the normal transfer rate when xn heads are mounted on the rotary drum, the magnetic tape 39 is transported at normal tape transport speed and the rotary drum is rotated at the normal rotational speed. Because it is possible to obtain the normal transfer rate when xn heads are mounted on the rotary drum, the edited source can be monitored from anywhere in the edit system without adding extra circuits or the like, thereby further increasing edit work efficiency.

When the xn heads are mounted on the rotary drum, if the normal transfer rate is required, then the magnetic tape 39 is transported at normal transport speed and the rotary drum is rotated at normal rotational speed. Therefore, it is possible to carry out some editing work, such as confirmation, monitoring or the like without adding special arrangements therefor.

To obtain 1/n times the normal transfer rate when xn heads are mounted on the rotary drum, the magnetic tape 39 is transported at the normal tape transport speed and the rotary drum is rotated at 1/n times the normal rotational speed. Because it is possible to obtain 1/n times the normal transfer rate when xn heads are mounted on the drum, processing such as selecting video and audio data can be carried out with less errors without adding extra circuits, thereby further increasing edit work efficiency.

The following table shows arrangements for obtaining four (n=4) times the normal transfer rate, assuming two heads are used to obtain a normal transfer rate (x=2).

|  | case 1 | case 2 | case 3 | case 4 |
| --- | --- | --- | --- | --- |
| no. heads (h) | 8 | 4 | 3 | 2 |
| tape transport speed (n) | 4 × normal | 4 × normal | 4 × normal | 4 × normal |
| drum rotational speed (d) | 1 × normal | 2 × normal | 8/3 × normal | 4 × normal |
| no. tracks (t) | 4 | 2 | 3/2 | 1 |

In case 1, n times the normal transfer rate is obtained with 2n heads mounted on the rotary drum, the tape transported at n times the normal tape transport speed, the rotary drum rotated at the normal rotational speed and the rotary drum lead angle being such that the head traverses n conventionally formed tracks during one rotation of the rotary drum when the tape is stopped.

For example, to obtain 4 times the normal transfer rate with 8 recording/reproducing heads mounted on the rotary drum, the tape is transported at 4 times normal tape transport speed, the rotary drum is rotated at the normal rotational speed and the rotary drum lead angle is set so that the number of tracks t traversed during one rotation of the drum when the tape is stopped is 4. In this case, the number of the recording and reproducing heads 38-1, 38-2, . . . , 38-n, . . . , 38-2n is 2n if the magnetic tape 39 is transported at n times normal tape transport speed and if the transfer rate is n times normal transfer rate under the condition that the rotational speed of the rotary drum is set to the normal rotational speed.

In case 1, the reason that x is set to "2" is that, if "normal tape transport speed" is considered to be a time in which slant tracks of one frame are formed on the magnetic tape 39 during the rotary drum is rotated y times when the two heads in total are mounted on the rotary drum with an angular range of 180 degrees, the magnetic tape 39 should be transported at n times normal tape transport speed in order to form slant tracks of one frame on the magnetic tape 39 by using 2n recording/reproducing heads during the rotation of the same rotary drum y.

In the case of the NTSC signal, the video and audio signals are recorded on the tape at n times normal speed by sequentially scanning the tape transported at n times normal tape transport speed with xn recording/reproducing heads mounted on the rotary drum rotated at the normal rotational speed and having a lead angle magnified by n. The normal speed is 60 fields/second in the case of the NTSC signal, and 50 fields/second in the case of the PAL signal.

Figure 4A:
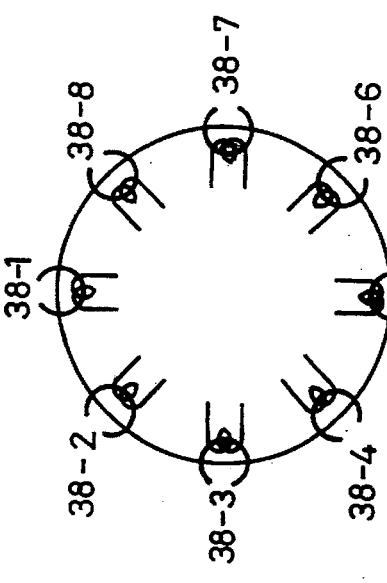

FIG. 4A shows a rotary drum having eight heads mounted thereon. Opposing heads 38-1, 38-5; 38-2, 38-6; 38-3, 38-7; and 38-4, 38-8 form four pairs of heads. Although the heads are shown with equidistant angular spacing on the perimeter of the drum, other configurations are possible such as four heads close to each other, opposed by the other four heads of the respective head pairs.

Figure 4B:
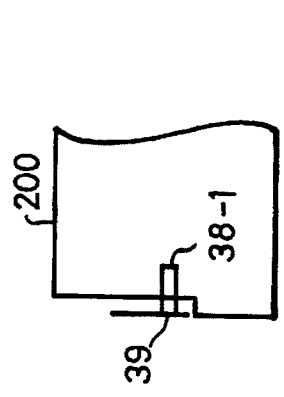

FIG. 4B is a cross sectional view of head 38-1 mounted on rotary drum 200 and tracing tracks on magnetic tape 39.

Figure 4C:
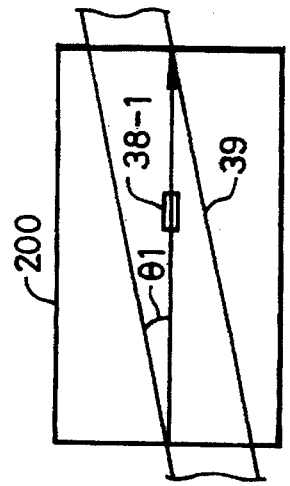

FIG. 4C shows a track traced by the head 38-1. The lead angle $\theta_1$ is defined between the path of the head 38-1 and the edge of the tape 39.

FIG. 4D shows that, for case 1, the number of conventionally formed tracks t traversed by the head 38-1 during one rotation of the rotary drum when the tape is stopped is four. When the tape is transported at four times the normal speed, a high speed machine according to case 1 forms tracks at a conventional angle.

In case 2, to obtain 4 times the normal transfer rate with 4 recording/reproducing heads mounted on the rotary drum, the tape is transported at 4 times the normal tape transport speed, the rotary drum is rotated at 2 times the normal rotational speed, and the rotary drum lead angle is set so that the number of conventionally formed tracks t traversed during one rotation of the drum when the tape is stopped is 2, as shown in FIG. 4E.

In case 3, to obtain 4 times the normal transfer rate when 3 recording/reproducing heads, for example, are mounted on the rotary drum, the tape is transported at 4 times the normal tape transport speed, the rotary drum is rotated at 8/3 times the normal rotational speed, and the rotary drum lead angle is set so that the number of conventionally formed tracks t traversed during one rotation of the drum when the tape is stopped is 3/2, as shown in FIG. 4F.

In case 4, the number of heads is reduced in order to further simplify the circuit scale. When two heads are mounted on the rotary drum, the tape is transported at 4 times the normal tape transport speed, and the rotary drum is rotated at 4 times the normal rotational speed, 4 times the normal transfer rate can be realized using a rotary drum with a conventional lead angle, such as 4°53'6" for an 8 mm format recording tape, as shown in FIG. 4G. That is, in case 4, when the tape is stopped, the rotary drum lead angle $\theta_1$ is set to its conventional value, so that a head traverses one track during one rotation of the drum.

FIG. 5 shows the high speed transfer machines 21 and 26 as VTRs, assuming the parameters of case 4. The number of the ECC adding circuits 33-1 to 33-n, the channel coding circuits 34-1 to 34-n, the recording amplifiers 35-1 to 35-n, the playback amplifiers 42-1 to 42-n, the data extracting circuits 43-1 to 43-n, the channel decoding circuits 44-1 to 44-n, and the error correcting circuits 45-1 to 45-n can all be reduced to one. The timebase expanding circuits, timebase compressing circuits, the demultiplexer 31 and the multiplexer 48 can be removed. Further, it is sufficient to provide two rotary transformers.

Setting of the transfer rate by the operator can be accomplished according to a first method or a second method.

In the first method, a predetermined number of heads is mounted on a rotary drum, and the number of heads actually used is varied in response to a designated transfer rate. The first method has the defect that the number of heads mounted on the rotary drum must be predetermined.

In the second method, the rotational speed of a rotary drum is varied. Some circuits can be removed by varying the number of the heads used and the transfer rate so that circuits that are used and that are not used are automatically selected. The second method has the advantage that the number of the heads mounted on the rotary drum can be minimized. To vary the transfer rate as described above, a system clock of the circuit must be varied in response to variation of the transfer rate. The system clock can be realized with ease by using a well-known VCO (voltage-controlled oscillator), a crystal oscillator and a frequency divider of high frequencies and a crystal oscillator and a multiplier of low frequencies.

Since the second method determines the number of heads, it is possible to vary the transfer rate by varying the rotational speed of the rotary drum and the transport speed of the magnetic tape 39. Specifically, the transport speed of the magnetic tape 39 and the rotational speed of the rotary drum are determined such that the number of tracks that are recorded or reproduced in the same time as that of the normal recording or reproducing can be increased by n times normal track number.

A conventional component digital format (D1 format or the like) carries out a so-called segment recording to form slant tracks in the ratio of 10 tracks per field by using 4 heads while the rotary drum is rotated at a rotational speed of 150 revolutions/second.

When n times the normal D1 format transfer rate is obtained with a normal rotational speed of the rotary drum and n times the normal magnetic tape transport speed, it is necessary to use 4n heads.

If n times the normal transfer rate is obtained with four heads, and the magnetic tape is transported at n times the normal tape transport speed, then the rotational speed of the rotary drum must be n times the normal rotational speed.

If the transfer rate is the normal transfer rate and 4n heads are used, then a normal tape transport speed and a normal drum rotational speed are used.

If the transfer rate is set to 1/n-time normal transfer rate and 4n heads are used, a normal tape transport speed and a 1/n times normal drum rotational speed are used. This is also true in the D2 format and other digital formats.

FIG. 6 is a chart referred to in explaining recording by the high speed transfer machine of FIG. 3.

In this example, n=4, that is, four times the normal transfer speed is assumed using 8 recording/reproducing heads, i.e., recording/reproducing heads 38-1, 38-2, . . . , 38-8.

In FIG. 6, reference symbols FD, TD and TP respectively indicate frame data, corresponding track data and track pattern. In this example, frame data P−1, P, P+1, P+2 are transferred during real time corresponding to one frame. Reference symbol Dn/F indicates one frame of data. The notation TDi(Hj), i=1 . . . 12, j=1. . . 8, indicates the number of a track for an amount of data and the number of the head which records this track data. Reference symbol Tn/F indicates the tracks for one frame. A solid arrow near the frame data FD row indicates a transfer order, and a solid arrow on the track pattern row indicates a tape transport direction, with the tape transported at 4 times the normal tape transport speed. Reference symbol Tn at the bottom of the track pattern row indicates tracks recorded in real time corresponding to one frame period.

The frame P consists of track data TD1(H1), TD2(H2), TDS(H8), . . . , TD12(H4). That is, data for the first track TD1 is recorded by head H1 (the head 38-1), data for the second track TD2 is recorded by head H2 (the head 38-2), data for the eighth track TD8 is recorded by head H8 (the head 38-8), and data for the twelfth track TD12 is recorded by head H4 (the head 38-(12 modulo 8)=38-4). FIG. 6 shows the tracks for frame P with line shading.

The frame P+1 consists of track data TD1(H5) . . . TD5(H1) . . . TD12(H5). That is, data for the first track TD1 is recorded by head H5 (the head 38-5), data for the fifth track TD5 is recorded by head Hi (the head 38-1), and data for the twelfth track TD12 is recorded by head H8 (the head 38-8). FIG. 6 shows the tracks for frame P+1 with dot shading.

Thus, during two frame periods, each of the heads 38-1, 38-2, . . . , 38-8 records three tracks, with twelve tracks per frame. If there were eight tracks per frame, each of the heads 38-1, 38-2, . . . 38-8 would record one track per frame period.

Figure 7:
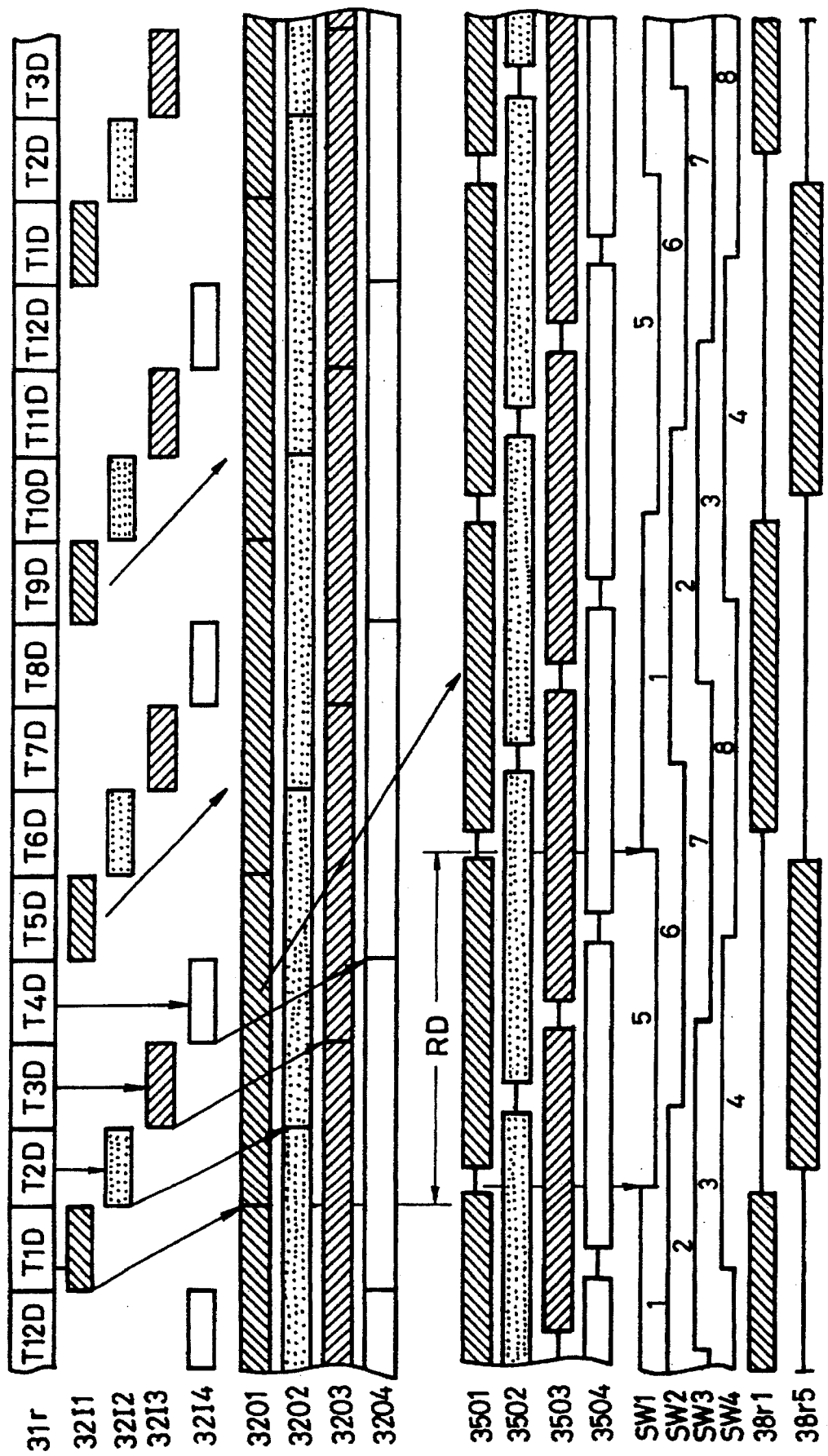

FIG. 7 is a timing chart showing transfer of data when the high speed transfer machine 26 shown in FIG. 3 records video and audio data.

Reference symbol 31r indicates input (high-speed transferred data) from the demultiplexer 31 of FIG. 3. Reference symbols 32I1 to 32I4 indicate inputs of the timebase expanding circuits 32-1 to 32-4. Reference symbols 3201 to 3204 indicate timebase-expanded outputs of the timebase expanding circuits 32-1 to 32-4. Reference symbols 3501 to 3504 indicate recording amplifier outputs of the recording amplifiers 35-1 to 35-4. Reference symbols SW1 to SW4 indicates switching signals supplied to the switches 36-1 to 36-4 from the system controller 50. The reference numerals "1" to "8" placed on the switching signals SW1 to SW4 indicate which of the heads 38-1, 38-2, ..., 38-8 are selected in accordance with high "1" level and low "0" level of the switching signals SW1 to SW4. Reference symbols 38r1, 38r5 indicate recorded signals of the recording/reproducing heads 38-1, 38-5, respectively.

Initially, the demultiplexer 31 is supplied with the video and audio data 31r at 4 times the normal transfer rate from the storage device 22 through the input terminal 30. Reference symbols T12D, T1D, T2D, T3D indicate data of the 12th track, the 1st track, the 2nd track, the 3rd track, and so forth. The demultiplexer 31 segments the video and audio data supplied thereto at every track. The video and audio data thus segmented form video and audio data 32I1, 32I2, 32I3 and 32I4 and are input to the timebase expanding circuits 32-1, 32-2, 32-3, 32-4.

The video and audio data 32I1 is formed into the 1st track T1D, the 5th track T5D, the 9th track T9D, shown hatched, by the timebase expanding circuit 32-1 to form tracks 3201. The video and audio data 32I2 is formed into the 2nd track T2D, the 6th track T6D, the 10th track T10D, shown dotted, by the timebase expanding circuit 32-3 to form tracks 3202. The video and audio data 32I3 is formed into the 3rd track T3D, the 7th track T7D, the 11th track T11D, shown reversed hatched, by the timebase expanding circuit 32-3 to form tracks 3203. The video and audio data 32I4 is formed into the 4th track T4D, the 8th track T8D, the 12th track T12D, shown without shading, by the timebase expanding circuit 32-4 to form tracks 3204. From an output timing standpoint, the 1st track T1D, the 2nd track T2D, the 3rd track T3D, the 4th track T4D, the 5th track T5D, the 6th track T7D, ..., the 11th track T11D, the 12th track T12D are output in that order, and also supplied to the timebase expanding circuits 32-1, 32-2, 32-3 and 32-4, in that order.

The ECC adding circuits 33-1, 33-2, 33-3 and 33-4 append error correction codes to the timebase-expanded outputs 3201, 3202, 3203 and 3204, which are then digitally modulated by the channel coding circuits 34-1, 34-2, 34-3 and 34-4 and supplied to and amplified for recording by the amplifiers 35-1, 35-2, 35-3 and 35-4 to form recording outputs 3501, 3502, 3503 and 3504.

The recording outputs 350i are delayed by a processing delay time RD relative to the timebase-expanded outputs 320i, i=1 ... 4 due to processing delay time in the ECC adding circuits 33i and the channel coding circuits 34-i.

The video and audio signals (current signals) 3501, 3502, 3503 and 3504 output from the recording amplifiers 35-1, 35-2, 35-3 and 35-4 are supplied to the movable contacts 36c of the switches 36-1, 36-2, 36-3 and 36-4, respectively. Fixed contact 36a of the switches 36-1, 36-2, 36-3, 36-4 are connected to the primary side of the rotary transformers 37-1, 37-2, 37-3, 37-4 through movable contact 36c when the switching signals SW1, SW2, SW3, SW4 are at high level. Fixed contacts 36b of the switches 36-1, 36-2, 36-3, 36-4 are connected to the primary side of the rotary transformer 37-5, 37-6, 37-7, 37-8 through movable contact 36c when the switching signals SW1, SW2, SW3, SW4 are at low level. The rotary transformers 37-1 ... 37-8 apply the track signals supplied thereto to the heads 38-1 ... 38-8 which record the video and audio signals 38r1 ... 38r8.

Figure 8:
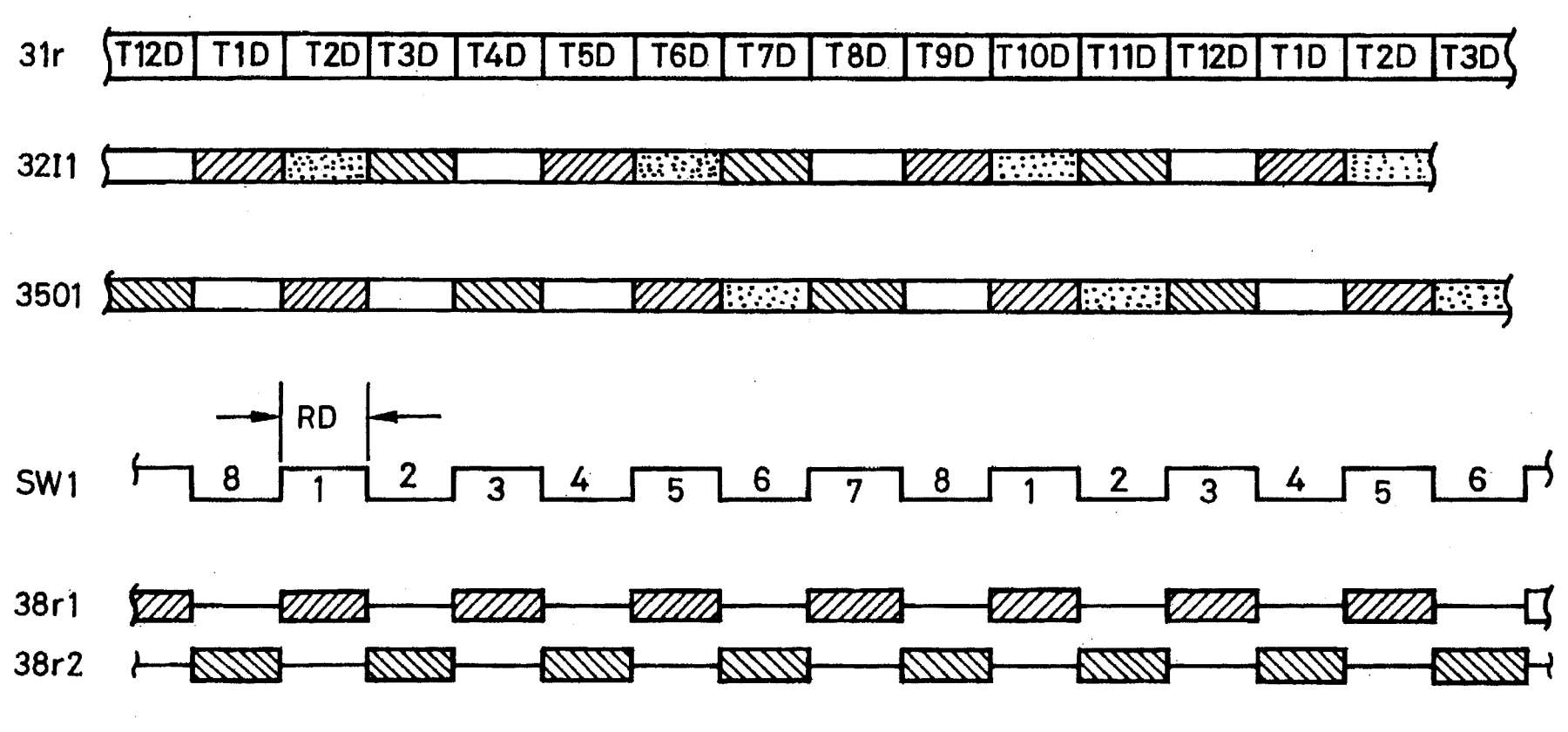

FIG. 8 is a timing chart showing transfer of data when the high speed transfer machine 26 shown in FIG. 5 records video and audio data. FIG. 8 is generally similar to FIG. 7, but reflects the lack of timebase expansion in case 4 described above, and provision of only one recording channel.

Reproducing by the high speed transfer machine of FIG. 3 will now be described.

Data recorded on the magnetic tape 39 are sequentially reproduced by the recording/reproducing heads 38-1, 38-2 ... 38-2n. Though not shown, the recording/reproducing heads 38-1, 38-2 38-2n are mounted in the rotary drum at an angular spacing of 180 degrees and are also spaced apart with an angular spacing. As shown in FIG. 3, when the recording system and the reproducing system are formed as one VTR, it is sufficient that the recording/reproducing heads 38-1, 38-2, ..., 38-n, ..., 38-2n serving as both recording and reproducing heads are mounted on the rotary drum or that the recording head and the reproducing head are adjacent to each other on the rotary drum. If the transport speed of the magnetic tape 39 is set to n times the normal transport speed as described above and the drum rotational speed (relative speed between the magnetic tape 39 and the recording/reproducing heads 38-1, 38-2, ..., 38-n, ..., 38-2n) is set to the normal rotational speed, then it is possible to obtain n times the normal transfer rate.

Since the recording/reproducing heads 38-1, 38-2, ..., 38-n, ..., 38-2n are mounted on the rotary drum with an angular extent of 180 degrees, the circuit systems can respectively be reduced by half by switching the recording system and the reproducing system at every half-rotation of the rotary drum.

While 2n heads are mounted on the rotary drum as the recording and reproducing heads and video and audio data are recorded and reproduced by rotating the rotary drum at normal rotational speed and by transporting the magnetic tape at n times normal speed, it is also possible to effect a high speed transfer by rotating the rotary drum at a higher than normal rotational speed, or to increase the number of heads and the rotational speed of the rotary drum. Accordingly, the number of recording/reproducing heads is not uniquely set to 2n in order to obtain n times the normal transfer rate.

Respective reproduced signals from the heads 38-1, 38-2, ..., 38-n, ..., 38-2n are sequentially supplied through the rotary transformers 37-1, 37-2, ..., 37-n, ..., 37-2n to one of fixed contacts 36a and 36b of the switches 36-1, 36-2, ..., 36-n. These switches 36-1, 36-2, ..., 36-n are supplied with the switching signals SW1 to SW4 from the system controller 50 similarly to the recording mode, and function to connect the movable contacts 36c to one of the fixed contacts 36a and 36b. The movable contacts 36c supply the reproduced signals to playback amplifiers 42-1, 42-2, ..., 42-n, respectively, which are adapted to amplify the reproduced signals and supply the amplified signals to data extracting circuits 43-1, 43-2, ..., 43-n, respectively.

The data extracting circuits 43-1, 43-2, ..., 43-n are operative to extract clock signals from the reproduced signals supplied thereto, to extract video and audio data using the extracted clock signals, and to supply the extracted video and audio data to channel decoding (CHDEC) circuits 44-1, 44-2, ..., 44-n.

The channel decoding circuits 44-1, 44-2, ..., 44-n function to digitally demodulate the video and audio data supplied thereto and to provide original (recovered) video and audio data to error correction circuits 45-1, 45-2, ..., 45-n.

The error correction circuits 45-1, 45-2, ..., 45-n serve to correct errors in the video and audio data supplied thereto based on error correction codes appended thereto, and to supply error-corrected video and audio data to timebase compressing circuits 46-1, 46-2, ..., 46-n. Errors that could not be corrected by using the ECCs are concealed to restore the recovered data in its closest form to the original data.

The timebase compressing circuits 46-1, 46-2, ..., 46-n include dual port memories and write/read circuits. These timebase compressing circuits 46-1, 46-2, ..., 46-n write the video and audio data supplied thereto from the error correction circuits 45-1, 45-2, ..., 45-n in the dual port memories at normal speed and read the data written in the dual port memories at n times the normal speed. The video and audio data read out at high speed from the timebase compressing circuits 46-1, 46-2, ..., 46-n are sequentially supplied to a multiplexer 47.

The multiplexer 47 selects and outputs the video and audio data sequentially supplied thereto in a transmission order and applies the transmission ordered data to an output terminal 48.

If the high speed transfer machine of FIG. 3 is the high speed transfer machine 21 shown in FIG. 2, terminal 48 supplies data to the storage device 22 as video and audio data 48p.

If the high speed transfer machine of FIG. 3 is the high speed transfer machine 26 shown in FIG. 2, then when the high speed transfer machine 26 is used to output data in the transmission system, if the reproduced video and audio data are compressed data, the next stage (e.g., auto changer system, master switcher and transmitter) of the transmission system should include a timebase expanding circuit. Therefore, to avoid the next stage system from being modified, the outputs of the timebase compressing circuits 46-1, 46-2, ..., 46-n should not be used but the outputs of the error correction circuits 45-1, 45-2, 45-n should be used. Specifically, output terminals of the error correction circuits 45-1, 45-2, ..., 45-n are connected to the output interface circuit 41 which converts the video and audio data into the original data and outputs the same to terminal 41a. With this arrangement, some suitable means, such as a television monitor or the like are connected to the output interface circuit 41 and a picture displayed on the picture screen of such television monitor can be monitored.

Operation unit 49 includes a display unit and an operation key group, not shown. When the operator operates this operation unit 49 or the recording/reproducing control signal from the control unit 27 shown in FIG. 2 is supplied through an input terminal 51 to a system controller 50, the system controller 50 supplies a system clock/synchronizing signal generating circuit 52 with a control signal.

The system clock/synchronizing signal generating circuit 52 supplies necessary clocks and synchronizing signals to the demultiplexer 31, the timebase expanding circuits 32-1 ... 32-n, the ECC adding circuits 33-1. .. 33-n, the channel coding circuits 34-1 . . . 34-n, the data extracting circuits 43-1 . . . 43n, the channel decoding circuits 44-1 . . . 44-n, the error correction circuits 45-1 . . . 45-n, the timebase compressing circuits 46-1 . . . 46-n and the multiplexer 47, respectively.

Figure 9:
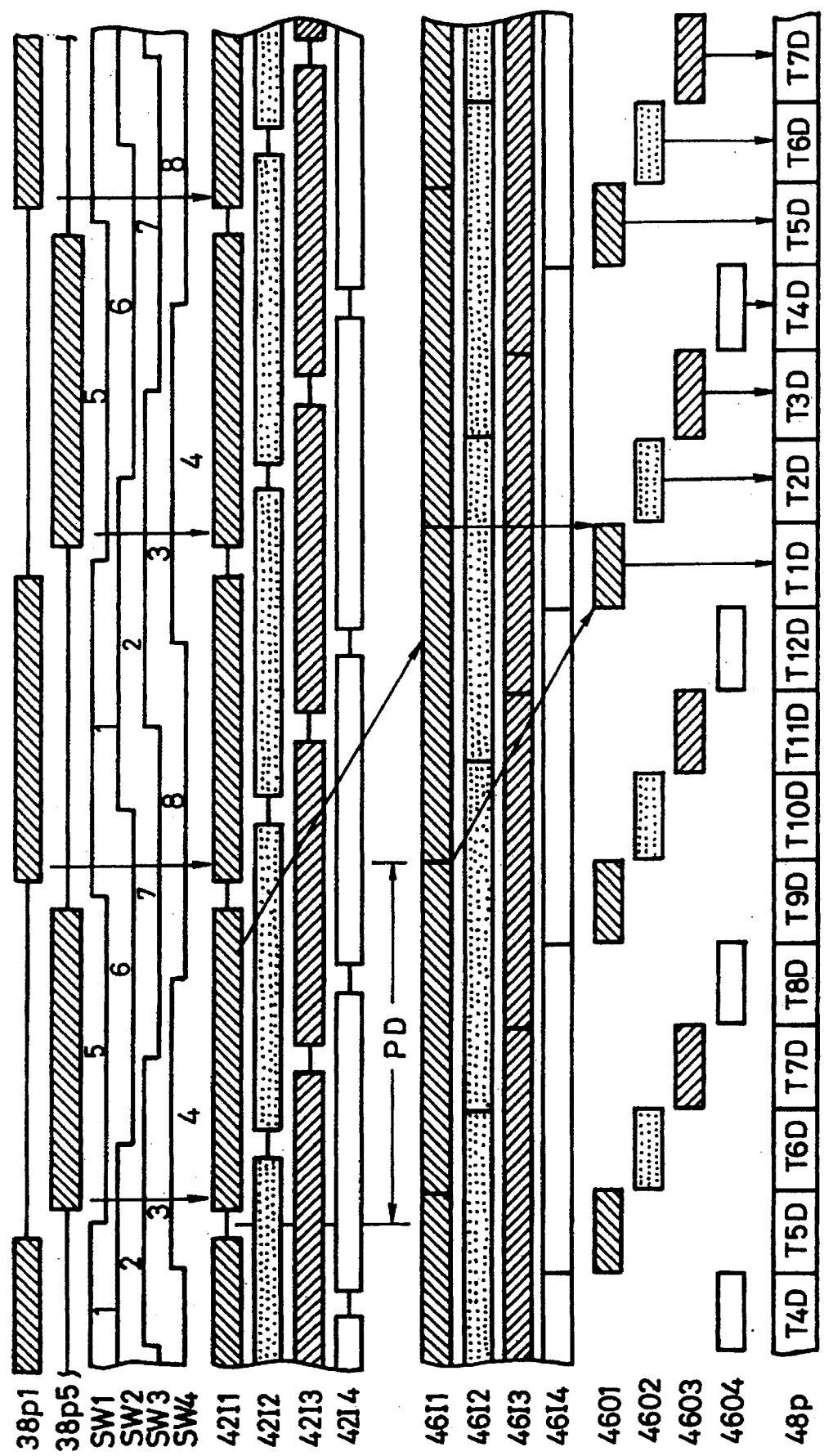

FIG. 9 is a timing chart showing transfer of data when the high speed transfer machine 21 shown in FIG. 3 reproduces video and audio data. Similarly to FIG. 7, 2n=8 heads are assumed to obtain a four times normal transfer rate.

Reference symbols 38p1, 38p5 indicate signals reproduced by the recording/reproducing heads 38-1, 38-5, respectively. Reference symbols SW1, SW2, SW3, SW4 indicate switching signals respectively supplied from the system controller 50. Reference symbols 42I1, 42I2, 42I3 and 42I4 indicate inputs to the playback amplifiers 42-1, 42-2, 42-3 and 42-4. Reference symbols 46I1, 46I2, 46I3 and 46I4 indicate inputs to the timebase compressing circuits 46-1, 46-2, 46-3 and 46O1. Reference symbols 46O1, 46O2, 46O3 and 46O4 indicate timebase-compressed outputs of the timebase compressing circuits 46-1, 46-2, 46-3 and 46-4. Reference symbol 48p indicates an output of the multiplexer 47.

Fixed contacts 36a of switches 36-1, 36-2, 36-3, 36-4 are connected to the primary side of rotary transformers 37-1, 37-2, 37-3, 37-4, respectively, through movable contact 36c when the switching signals SW1, SW2, SW3, SW4 are at high level. Fixed contacts 36b of switches 36-1, 36-2, 36-3, 36-4 are connected to the primary side of rotary transformers 37-5, 37-6, 37-7, 37-8, respectively, through movable contact 36c when the switching signals SW1, SW2, SW3, SW4 are at low level.

As shown by numerals on the switching signals SW1, SW2, SW3, SW4, when these switching signals are at high level, the reproduced signals 38p1, 38p2, 38p3, 38p4 from the heads 38-1, 38-2, 38-3, 38-4 are supplied to the playback amplifiers 42-1, 42-2, 42-3, 42-4, respectively. When the switching signals are at low level, the reproduced signals 38p5, 38p6, 38p7, 38p8 from the heads 38-5, 38-6, 38-7, 38-8 are supplied to the playback amplifiers 42-1, 42-2, 42-3, 42-4, respectively.

The signals 38p1, 38p5; 38p2, 38p6; 38p3, 38p7; 38p4, 38p8 and the signals 42I1, 42I2, 42I3, 42I4, respectively, temporally correspond.

The reproduced signals 42I1 to 42I4 supplied to the playback amplifiers 42-1 to 42-4 are amplified for playback and supplied to the data extracting circuits 43-1 to 43-4 and clock signals are obtained and used to extract video and audio signals which are sequentially supplied to the channel decoding circuits 44-1 to 44-4 and decoded to provide recovered video and audio data that are supplied to the error correction circuits 45-1 to 45-n for error-correction as described above. The error-corrected video and audio data are supplied to the timebase compressing circuits 46-1 to 46-4, respectively, as inputs 46I1, 46I2, 46I3 and 46I4.

The processing time required by the channel decoding circuits 44-1 to 44-4 and the error correction circuits 45-1 to 45-4 introduces a delay time PD into the reproduced signals.

The video and audio data 46I1 to 46I4 are temporarily written in the dual port memories of the timebase compressing circuits 46-1 to 46-4 and then read out therefrom at four times the normal read rate, thereby performing timebase compression with a factor of ¼ to produce compressed video and audio data 46O1 to 46O4 that are sequentially supplied to the multiplexer 47. The compressed video and audio data 46O1 comprises data for the first, fifth and ninth tracks T1D, T5D, T9D, shown hatched; the compressed video and audio data 46O2 comprises data for the second, sixth and tenth tracks T2D, T6D, T10, shown dotted; the compressed video and audio data 46O3 comprises data for the third, seventh and eleventh tracks T3D, T7D, T11D, shown reverse hatched; and the compressed video and audio data 46O4 comprises data for the fourth, eighth and twelfth tracks T4D, T8D, T12D, shown without shading.

The multiplexer 47 converts the compressed video and audio data 4601 to 4604 to serial data, and outputs the serial data as high speed video and audio data 48p to the output terminal 48 for supply to the storage device 22.

Figure 10:
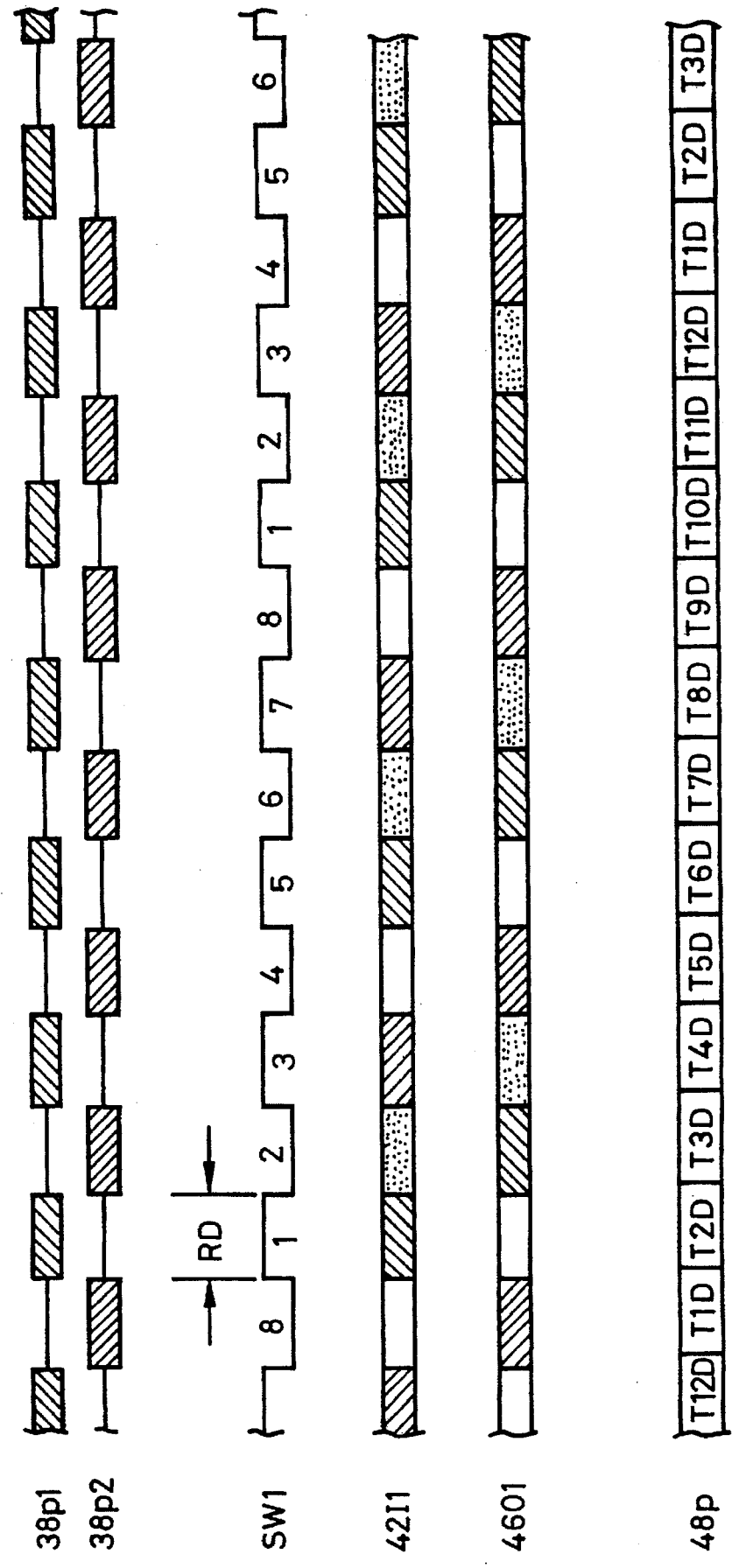

FIG. 10 is a timing chart showing transfer of data when the high speed transfer machine 21 shown in FIG. 5 reproduces video and audio data. FIG. 10 is generally similar to FIG. 9, but reflect the lack of need for timebase compression in case 4 described above, and provision of only one reproducing channel.

Figure 11:
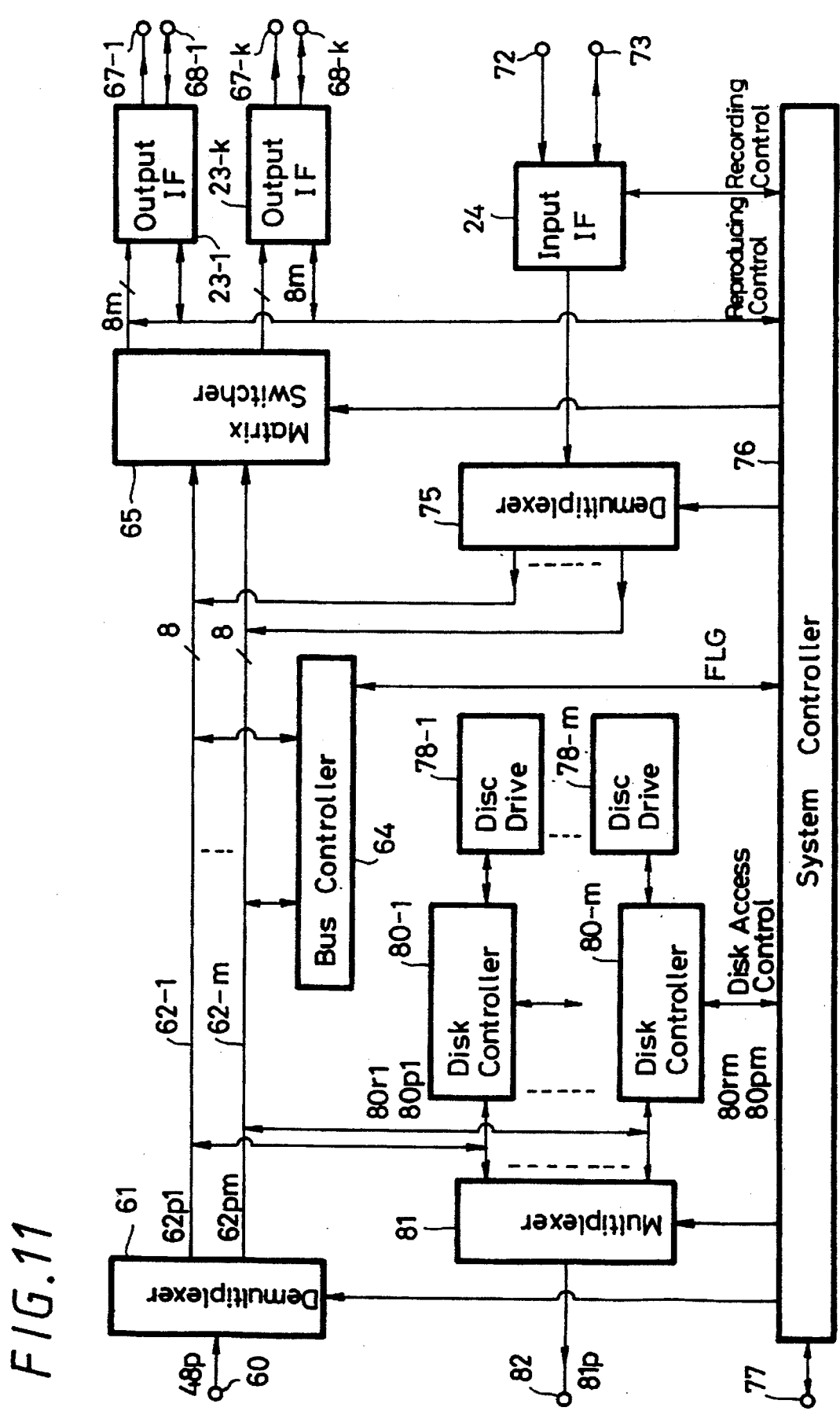
FIG. 11 is a block diagram showing an embodiment of a storage device 22 according to the present invention.

FIG. 11 shows an embodiment of the storage device 22 of FIG. 2.

The high speed transfer machine 21 supplies video and audio data 48p at high speed to input terminal 60, which supplies the video and audio data to a demultiplexer 61 that serves to segment and expand (e.g., by temporal unit such as a second) the high-speed video and audio data 48p to produce segmented and expanded streams of 8-bit video and audio data 61p1, 61p2, . . . , 61pm, and to supply the 8-bit data streams as storage video and audio data 80p1, 80p2, . . . , 80pm through buses 62-1, 62-2, . . . , 62-m each formed of 8 bit lines to disc controllers 80-1, 80-2, 80-m, respectively. The disc controllers 80-1, 80-2, . . . , 80-m serve to supply the streams of video and audio data 80p1, 80p2, . . . , 80pm to disc drives 78-1, 78-2, . . . , 78-m based on disc access control signals from a system controller 76.

The cardinality of the streams of video and audio data is equal to the cardinality of the buses, that is, there are m buses and m streams of video and audio data.

The disc drives 78-1, 78-2, . . . , 78-m can be formed of drives for hard discs, optical discs and/or flexible discs having a recording capacity of at least 20 Mbytes or larger.

The system controller 76 is adapted to supply the disc access control signals to the disc controllers 80-1, 80-2, . . . , 80-m in response to the recording/reproducing control signal supplied thereto from the control unit 27 shown in FIG. 2 through an input and output terminal 77, data reproducing control signals from the output interface circuits 23-1, 23-2, . . . , 23-k shown in FIGS. 2 and 11, and data recording control signal from the input interface circuit 24 shown in FIG. 2. The system controller 76 also supplies reproduction control signals to the output interface circuits 23-1, 23-2, . . . , 23-k, the recording control signal to the input interface circuit 24, the control signal to the demultiplexers 75 and 81, a transfer synchronization control flag FLAG to a bus controller 64 which controls the buses 62-1, 62-2, . . . , 62-m, and a selection control signal to a matrix switcher 65 shown in FIG. 11.

After the recording/reproducing control signal supplied from the controller 27 indicates that the high-speed video and audio data 48p supplied to the demultiplexer 61 has been recorded on the disc drives 78-1, 78-2, . . . , 78-m, the operator inputs the starting frame and the ending frame in the form of time codes through the operation unit 28 shown in FIG. 2 while watching the source necessary for edit. After such processing has been carried out a plurality of times, a plurality of edit sources are stored in the media set on the disc drives 78-1, 78-2, . . . , 78-m.

After the video and audio data that had been transferred at high speed to the disc drive media has been segmented and recorded, e.g., in temporal units of every second, then when the recording/reproducing control signal supplied from the control unit 27 to terminal 77 indicates playback, the controller 76 supplies the disc access control signals to the disc controllers 80-1, 80-2, . . . , 80-m, which control the disc drives 78-1, 78-2, . . . , 78-m to reproduce the video and audio data recorded on the media set on the disc drives and to supply the played back video and audio data 80p1, 80p2, . . . , 80pm through the buses 62-1, 62-2, . . . , 62-m, respectively, to the matrix switcher 65.

The matrix switcher 65 is adapted to select the 8-bit parallel video and audio data 80p1, 80p2, . . . , 80pm supplied thereto through the buses 62-1, 62-2, . . . , 62-m in each time slot based on the selection control signal from the system controller 76, and to supply the selected data to the output interface circuits 23-1, 23-2, . . . , 23-k. Specifically, the matrix switcher 65 sets the m video and audio data 80p1, 80p2, . . . , 80pm supplied thereto through the buses 62-1, 62-2, . . . 62-m to k video and audio data used in the video special effect mixer 25 shown in FIG. 2. When n=m=k, the conventional video special effect mixer 25 can be used.

The output interface circuits 23-1, 23-2, . . . , 23-k convert the k streams of video and audio data supplied thereto from the matrix switcher 65 into data having a rate of 60 fields/second and supply the same through the terminals 67-1, terminals 67-1, 67-2, ... 67-k to the video special effect mixer 25 based on the reproduction control signals from the control unit 27 shown in FIG. 2 through terminals 68-1, 68-2, . . . , 68-k. The output interface circuits 23-1, 23-2, . . . 23-k also supply data reproduction control signals to the controller 76.

Normal transfer rate video and audio data Vp3, as processed for special effects by the video special effect mixer 25 shown in FIG. 2, are supplied through an input terminal 72 to the interface circuit 24, which temporarily buffers and outputs the video and audio data supplied thereto. Alternatively, externally supplied normal transfer rate video and audio data may be applied to terminal 72. The input interface circuit 24 supplies the recording control signal to the controller 76 based on the recording control signal supplied thereto through an input and output terminal 73 from the control unit 27 shown in FIG. 2.

The input interface circuit 24 supplies an output to a demultiplexer 75, which serves to segment the signal supplied thereto into m streams of original video and audio data at every second. The segmented data streams are supplied through the buses 62-1, 62-2, . . . , 62-m to the disc controllers 80-1, 80-2, 80m as recording video and audio data 80r1, 80r2, . . . , 80rm, for recording on the media loaded on the disc drives 78-1, 78-2, 78-m based on the disc access control signal from the system controller 76.

Relationships among the areas Ar1, Ar2 of the storage device 22 and the disc drives 78-1, 78-2, . . . , 78-m will be described.

One relationship is that the media loaded on the disc drives 78-1, 78-2, . . . , 78-m are allocated to one of the areas Ar1 and Ar2. If the hard disc is composed of a plurality of discs, the areas Ar1, Ar2 may be set in every disc or the areas Ar1, Ar2 may be set in every cylinder. Further, the disc controllers 80-1, 80-2, . . . , 80-m, may include tables in which there are memorized address of the video and audio data supplied from the demultiplexer 61 and address of the video and audio data processed by the video special effect mixer 25.

Another relationship is that the disc drives 78-1, 78-2, . . . , 78-m are allocated to one of the areas Ar1 and Ar2.

After editing, there exists an edit source and an edited source. Since the edit source often may be edited again, it is necessary to automatically manage the edit source and the edited source. Thus, when the operator names sources of the edit unit recorded on the disc drives 78-1, 78-2, . . . , 78-m by entering names by the operation unit 28, it is possible to display a variety of information, such as names of every source, data length (time data, etc.) or the like on a display unit, not shown but which may be mounted on the operation unit 28. If sources to be edited are not stored in the disc drives 78-1, 78-2, ..., 78-m, the operator can consider the edit work in the source unit and operate the operation unit 28.

When the sources are reproduced by the disc controllers 80-1, 80-2, ..., 80-m, the operator can select sources and a source reproducing method by operating predetermined keys of the operation unit 28 or by clicking a command execute icon displayed on the display unit with a mouse. For example, a slow motion playback can be carried out by intermittently reading out video and audio data from the media set on the disc drives 78-1, 78-2, ..., 78-m. Also, a quick motion playback can be carried out by skipping frames of video and audio data, such as one skipping in several frames.

When the operator controls the control unit 27 by operating the operation unit 28 so as to issue a command such that the edited video and audio data is recorded on the high speed transfer VTR 26, the recording/reproducing control signal from the control unit 27 is supplied to the system controller 76. The system controller 76 supplies disc access control signals to the disc controllers 80-1, 80-2, ..., 80-m based on the recording and reproducing control signal supplied thereto from the control unit 27.

The video and audio data as processed for special effects by the video special effect mixer 25 are read out from the disc drives 78-1, 78-2, ..., 78-m. The disc access control signal at that time controls the disc drives 78-1, 78-2, ..., 78-m such that video and audio data are read out at n times the normal read-out speed and are supplied to a multiplexer 81 which combines the video and audio data supplied thereto into a combined stream of original consecutive data and outputs the original consecutive data as high-speed video and audio data 81p to an output terminal 82 for supply to the high speed transfer machine 26 which records the data 81p on the magnetic tape of the video tape cassette loaded thereon in slant tracks.

In this embodiment, a plurality of disc drives 78-1, 78-2, ..., 78-m are used because of a transfer rate limit of a conventional disc drive. If a high-speed storage device 22 of large capacity is used, then m=1. In this case, the demultiplexers 61, 75 and the multiplexer 81 may be omitted.

Because the storage device 22 can record and reproduce information at n times the normal transfer rate and at the normal transfer rate, matching of data within the edit system can be carried out satisfactorily, whereby the edit system with excellent edit efficiency can be obtained.

Because the number of buses is the same as the number of information streams, storage and reading in the storage device 22 can be carried out efficiently so that processing, such as recording, reproducing and edit, can be carried out simultaneously.

Because a plurality of media may be used for the areas Ar1, Ar2, the edit source and the edited source can be easily managed.

Because the storage device 22 can expand and compress the timebase of the information stored therein, conventional editing or special effects equipment having a normal transfer rate can be used in the edit system.

Operation of the storage device 22 shown in FIG. 11 will be described with reference to FIGS. 12 and 13.

Figure 12:
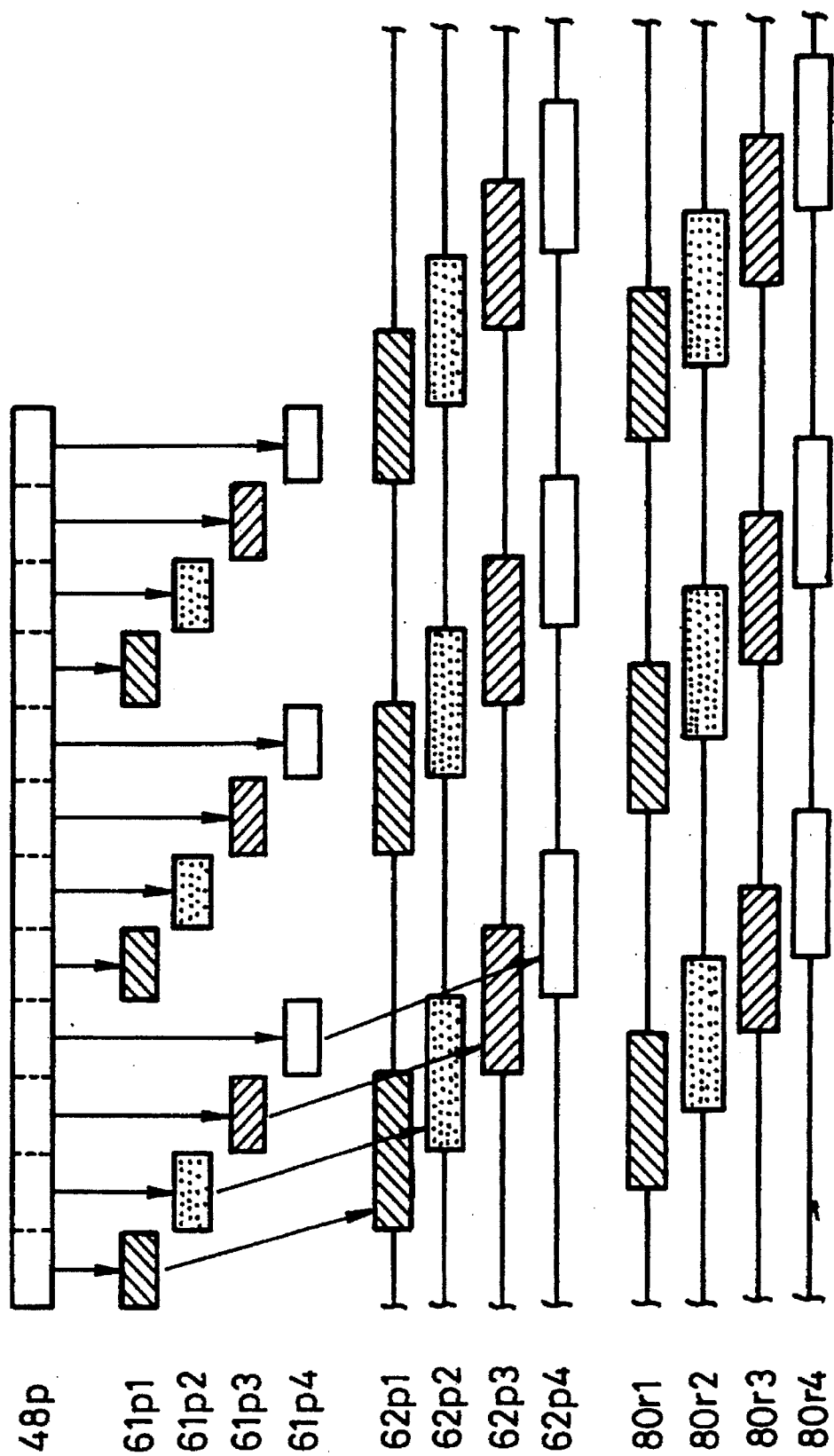
FIGS. 12 and 13 are timing charts to which reference is made in explaining recording and reproducing by the storage device 22 shown in FIG. 11.

FIG. 12 is a timing chart used to explain the high speed transfer and recording operation of the storage unit 22 shown in FIG. 11. The transfer rate is assumed to be four times the normal transfer rate, that is, the high speed transfer machine uses 8 recording/reproducing heads.

Reference symbol 48p indicates video and audio data supplied at high speed from the high speed transfer machine 21 through the input terminal 60 to the demultiplexer 61. Reference symbols 61p1, 61p2, 61p3 and 61p4 indicate video and audio data segmented by the demultiplexer 61. Reference symbols 62p1, 62p2, 62p3 and 62p4 indicate video and audio data that are supplied to the buses 62-1, 62-2, 62-3 and 62-4 after timebase-expansion by the demultiplexer 61. Reference symbols 80r1, 80r2, 80r3 and 80r4 indicate video and audio data supplied to the disc controllers 80-1, 80-2, 80-3 and 80-4 through the buses 62-1, 62-2, 62-3 and 62-4 as recording video and audio data.

As shown by dashed lines, the demultiplexer 61 segments the high-speed video and audio data 48p at every temporal unit (e.g., one second) to provide video and audio data 61p1 to 61p4. In this embodiment, since the high-speed video and audio data 48p represents a 12-second cut and video and audio data is segmented at every second, the transfer rate is 4 times the normal transfer rate and video and audio data of 240 fields are presented per second. The demultiplexer 61 expands the timebase of the video and audio data 61p1, 61p2, 61p3, 61p4 to form timebase-expanded video and audio data 61p2, 62p2, 62p3 and 62p4 which are supplied to the buses 62-1, 62-2, 62-3 and 62-4, respectively, and thence to the disc controllers 80-1, 80-2, 80-3 and 80-4 for storage as video and audio data 80r1, 80r2, 80r3 and 80r4 on the media loaded on the disc drives 78-1, 78-2, 78-3 and 78-4.

Figure 13:
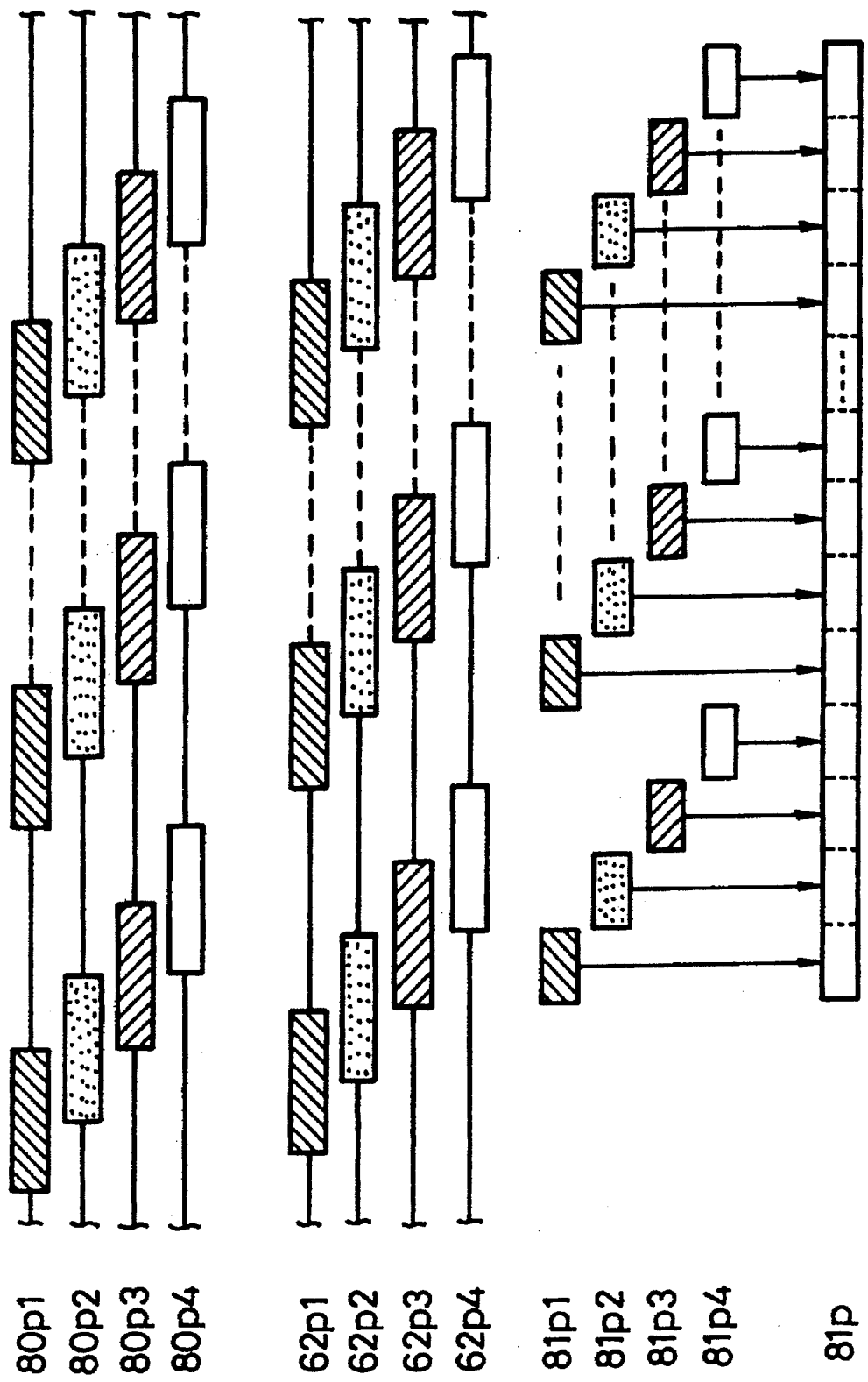

FIG. 13 is a timing chart used to explain the high speed transfer and reproducing operation of the storage device 22 shown in FIG. 11. The transfer rate is assumed to be four times the normal transfer rate, that is, the high speed transfer machine uses 8 recording/reproducing heads.

Reference symbols 80p1, 80p2, 80p3 and 80p4 indicate video and audio data that are supplied to the input interface circuit 24 from the video special effect mixer 25 or externally through the input terminal 72, converted by the demultiplexer 75 into m streams of video and audio data, supplied through the buses 62-1, 62-2, 62-3 and 62-4 to the disc controllers 80-1, 80-2, 80-3 and 80-4, stored on the media loaded on the disc drives 78-1, 78-2, 78-3 and 78-4 under the control of the disc controllers 80-1, 80-2, 80-3 and 80-4 and then read out from the media under the control of the disc controllers 80-1, 80-2, 80-3 and 80-4 or video and audio data read out from the area Ar1 shown in FIG. 2. Reference symbols 61p2, 62p2, 62p3 and 62p4 indicate video and audio data that are read out from the area Ar1 shown in FIG. 2 and supplied to the buses 62-1, 62-2, 62-3 and 62-4. Reference symbols 81p1, 81p2, 81p3 and 81p4 indicate video and audio data that are read out from the area Ar2 shown in FIG. 2, supplied to the multiplexer 81, segmented by the multiplexer 81 and memorized, read out at four times the normal write speed and then timebase-compressed. Reference symbol 81p indicates video and audio data output as original consecutive data after it was timebase-compressed by the multiplexer 81.

When the operator operates the operation unit 28 to enter a command to the control unit 27 to cause the edited source stored in the storage device 22 to be reproduced, transferred to and recorded in the video tape cassette loaded on the high speed transfer machine 26, the control unit 27 supplies a recording/reproducing control signal through a terminal 77 to the system controller 76 shown in FIG. 11.

The controller 76 supplies disc access control signals to the disc controllers 80-1, 80-2, 80-3 and 80-4 based on the recording/reproducing control signal supplied thereto from the control unit 27 to control the disc drives 78-1, 78-2, 78-3 and 78-4 to thereby reproduce video and audio data from the media loaded thereon. When the video and audio data 80p1, 80p2, 80p3 and 80p4 are read out from the area Ar1, such video and audio data are supplied to the buses 62-1, 62-2, 62-3 and 62-4. When the video and audio data 80p1, 80p2, 80p3 and 80p4 are read out from the area Ar2, such video and audio data are supplied to the multiplexer 81.

The operator can insert newly-edited video and audio data into previously-edited video and audio data stored in the area Ar2 by appropriately operating the operation unit 28. This capability eliminates the need to repeatedly record edited data using the high speed transfer machine 26, and instead permits creation of repeatedly edited data which is recorded once by the high speed transfer machine 26.

Because it is possible to insert newly-edited source within the previously-edited source, the resultant edited information can be recorded on a video tape cassette without edit points.

The video and audio data 61p2, 62p2, 62p3 and 62p4 from the data buses 62-1, 62-2, 62-3 and 62-4 are supplied to the multiplexer 81 and temporarily written in a memory, not shown, of this multiplexer 81. Then, the written data are read out from the multiplexer memory at four times the normal write speed as high speed video and audio data 81p1, 81p2, 81p3 and 81p4, which are supplied to the output terminal 82 and thence to the high speed transfer machine 26 shown in FIG. 2.

Figure 14:
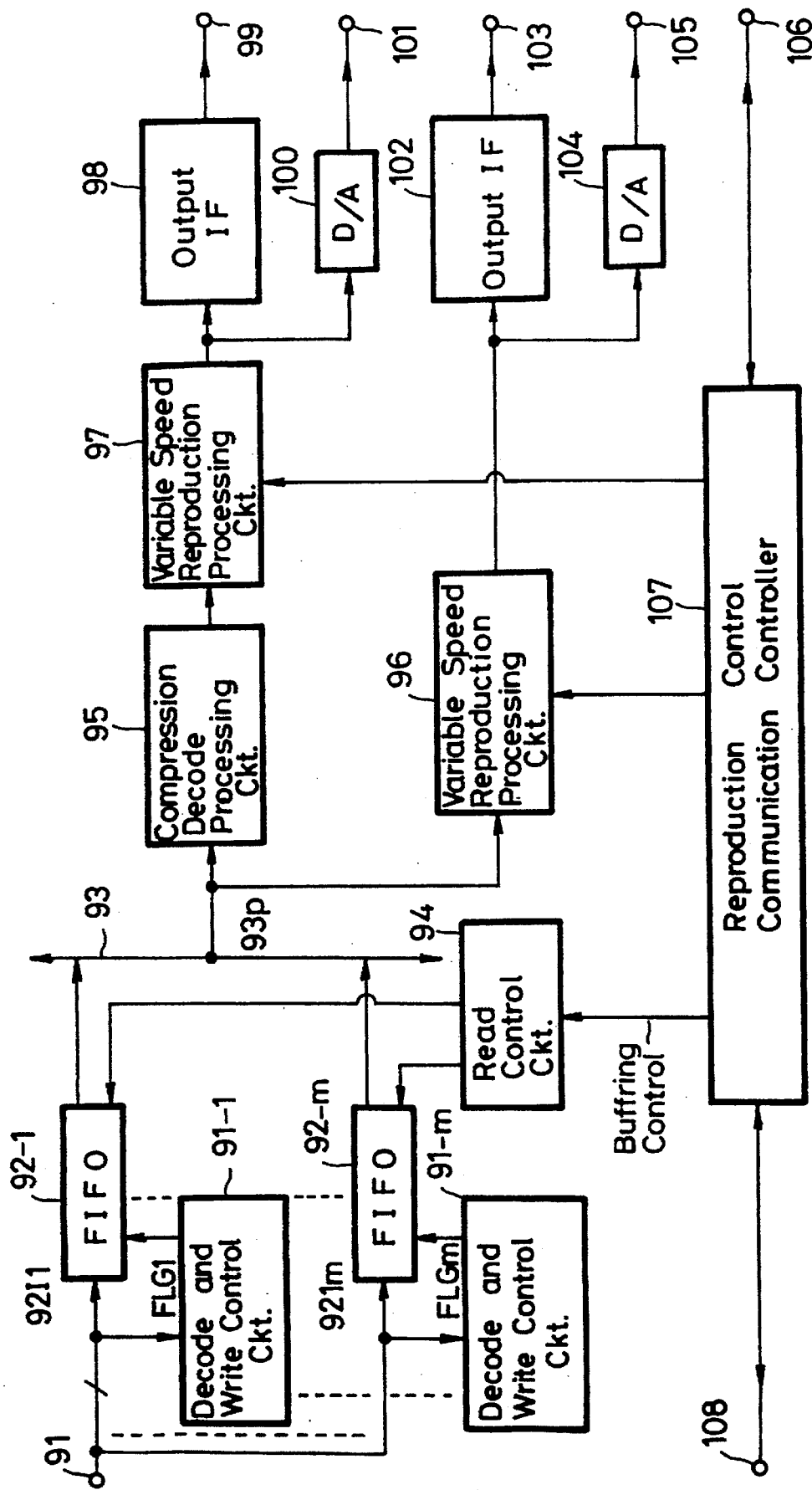
FIG. 14 is a block diagram showing an embodiment of the output interface circuits 23-1, 23-2, . . . , 23-k of FIG. 2.

FIG. 14 shows an embodiment of the output interface circuits 23-1, 23-2, . . . , 23-k shown in FIGS. 2 and 11.

The matrix switcher 65 of FIG. 11 supplies the selected video and audio data to input terminal 91 of FIG. 14, which applies the selected data to matrix switcher 65 is supplied through the input terminal 91 to decode and write control circuits 91-1, 91-2, . . . , 91-m, and to first-in first-out (FIFO) memories 92-1, 92-2, . . . , 92-m.

The decode and write control circuits 91-1, 91-2, . . . , 91-m decode video and audio data (8 bits×m) supplied thereto to obtain flags FLG1, FLG2, . . . , FLGm, and supply the flags FLG1, FLG2, . . . , FLGm to FIFO memories 92-1, 92-2, . . . , 92-m, respectively, together with a write control signal so that the video and audio data supplied through the input terminal 91 are written in the FIFO memories 92-1, 92-2, . . . , 92-m.

The FIFO memories 92-1, 92-2, . . . , 92-m function to read out the video and audio data stored therein to a bus 93 in response to a read control signal from a read control circuit 94, which is based on a buffering control signal from a reproduction control and communication controller 107.

The reproduction control and communication controller 107 serves to generate the buffering control signal, an audio variable speed reproduction control signal and a video variable speed reproduction control signal based on the reproduction control signal supplied thereto from the control unit 27 shown in FIG. 2 and also supplies a data reproduction control signal through an input and output terminal 108 to the system controller 76 of the storage device 22 shown in FIG. 11.

Decompressing and decoding processor circuit 95 is used when video and audio data supplied from the FIFO memories 92-1, 92-2, . . . , 92-m through the bus 93 have been compressed. If the compression system is a variable length coding system, such as DCT (discrete cosine transform), quantization, run length code coding and Huffman coding, the decompressing and decoding processor circuit 95 is composed of a decoding circuit, an inverse quantizing circuit and an IDCT (inverse discrete cosine transform) circuit. This is also true in a wavelet transform and an ADRC (adaptive dynamic range coding) or the like.

A variable speed reproduction processor circuit 97 is operative to process video data supplied thereto from the decompressing and decoding processor circuit 95 or the bus 93. When the variable speed reproduction processor circuit 97 includes a memory, video data are written in this memory at high speed, e.g., at four times the normal transfer rate, and are then read out from the memory the normal read speed, e.g., ¼ of the write speed. The circuit 97 supplies the read out video data to a D/A converter 100 and to an output interface circuit 98 (e.g., various serial or parallel interface circuits, such as RS232C, RS422, small computer systems interface (SCSI)) which converts the video data supplied thereto into a format that can be used in the video special effect mixer 25 and supplies the processed video data through an output terminal 99 to the video special effect mixer 25 shown in FIG. 2.

The D/A converter 100 converts the video data supplied thereto to an analog video signal and supplies the converted analog video signal to an output terminal 101. The analog video signal may be supplied to a television monitor for display.

Variable speed reproduction processor circuit 96 is operative to process audio data supplied thereto from the bus 93. When the variable reproduction processor circuit 96 includes a memory, the audio data is written in the memory at high speed, e.g., four times the normal transfer rate, and then read out from the memory at normal speed and supplied to an output interface circuit 102 and a D/A converter 104. The output interface circuit 102 (e.g., various serial or parallel interface circuits, such as RS232C, RS422, SCSI) converts the audio data supplied thereto into a format that can be used in the video special effect mixer 25, and supplies the processed audio data through an output terminal 103 to the video special effect mixer 25 shown in FIG. 2.

The D/A converter 104 converts the audio data supplied thereto to an analog audio signal and supplies the converted analog audio signal to an output terminal 105. The analog audio signal may be supplied to an audio amplifier, acoustically reproduced by a speaker connected to the audio amplifier and monitored.

Because the variable speed reproduction processing circuits write data at high speed, and read data at normal speed, conventional editing or special effects equipment can be used with a high speed transfer machine reproducing the source video. Thus, the matching of data with different transfer rates can be made in the edit system.

Because the compressing and decoding circuit is provided for compressed data, it is possible to use even the compressed and coded video and audio data in the edit processing as the source.

Figure 15:
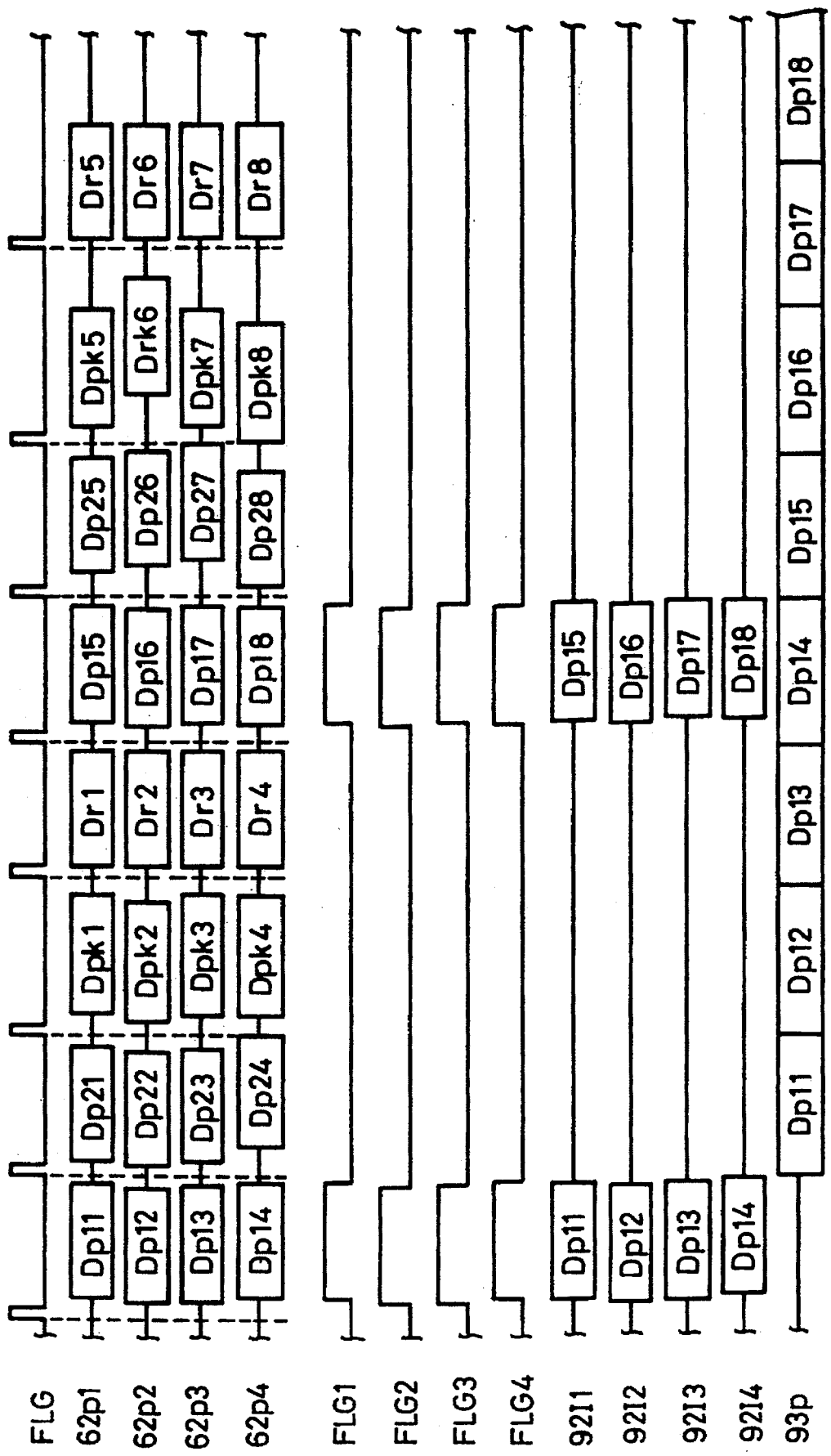
FIG. 15 is a timing chart referred to in explaining operation of the output interface circuits 23-1 . . . 23-k.

FIG. 15 is a timing chart illustrating operation of the interface circuit 23 shown in FIG. 14.

Reference symbol FLG indicates a bus transfer control flag supplied to the bus controller 64 from the controller 76 shown in FIG. 11. Reference symbols 61p2, 62p2, 62p3 and 62p4 indicate video and audio data on the buses 62-1, 62-2, . . . , 62-m shown in FIG. 11, that is, reproduced data Dpij, i=1 . . . k, j=1 to 4, and recording data Dr1 . . . Dr8. Reference symbols FLG1, FLG2, FLG3 and FLG4 indicate flags obtained when the decode and write control circuits 91-1, 91-2, . . . , 91-m shown in FIG. 14 decode the video and audio data 61p2, 62p2, 62p3 and 62p4. Reference symbols 92I1, 92I2, 92I3 and 92I4 indicate video and audio data that are supplied to and written in the FIFO memories 92-1, 92-2, ..., 92-m. Reference symbol 93p indicates video and audio data output from the bus 93.

The flag FLG is supplied from the system controller 76 to the bus controller 64. Low level periods of the flag FLG correspond to time slots. In the example shown in FIG. 15, the fourth and eighth time slots are used for recording and the other time slots are used for reproduction.

The disc drive 78-1 reproduces video and audio data Dp11, Dp21, Dpk1 in the first, second, kth (herein, third) time slots, respectively, and supplies this data to the bus 62-1. The disc drive 78-1 records video and audio data Dr1 supplied thereto from the input interface circuit 24 on the media loaded on the disc drive 78-1 in the fourth time slot. The disc drive 78-1 then reproduces video and audio data Dp15, Dp24, Dpk5 in the fifth, sixth and seventh time slots and supplies these video and audio data to the bus 62-1. In the eighth time slot, the disc drive 78-1 records video and audio data Dr5 supplied thereto from the input interface circuit 24 in the medium loaded on the disc drive 78-1.

The disc drives 78-2, 78-3 and 78-4 operate in a manner similar to the disc drive 78-1 to reproduce the data Dp12, Dp13, Dp14, Dp22, Dp23, Dp24, Dpk2, Dpk3, Dpk4, Dp16, Dp17, Dp18, Dp26, Dp27, Dp28, Dpk6, Dpk7, Dpk8, and to record the data Dr2, Dr3, Dr4, Dr6, Dr7, Dr8 on the media loaded thereon.

Assume, for example, that the video and audio data 61p2, 62p2, 62p3 and 62p4 are on the buses 62-1, 62-2, 62-3 and 62-4, and the video and audio data Dp11 to Dp14 and Dp15 to Dp18 are supplied to the video special effect mixer 25.

The video and audio data 61p2, 62p2, 62p3 and 62p4 on the buses 62-1, 62-2, 62-3 and 62-4 are supplied to and selected by the matrix switcher 65 and then supplied to the output interface circuits 23-1, 23-2, ..., 23-k, respectively. Specifically, the data 62p2 ... 62p4 are supplied through the respective input terminals 91 of the output interface circuits 23-1, 23-2, ..., 23-k to the decoding circuits 91-1, 91-2, ..., 91-4 which generate data reproduced flags FLG1, FLG2, FLG3 and FLG4 by decoding only data supplied to the video special effect mixer 25 and supply the generated reproduced flags FLG1, FLG2, FLG3 and FLG4 to the FIFO memories 92-1, 92-2, 92-3 and 92-4 and also supply the write control signals thereto.

Therefore, the video and audio data 92I1, 92I2, 92I3 and 92I4 are written in the FIFO memories 92-1, 92-2, 92-3 and 92-4, respectively. Accordingly, the data reproduced flags FLG1, FLG2, FLG3 and FLG4 can be considered as write enable signals of the FIFO memories 92-1, 92-2, 92-3 and 92-4. Specifically, when the data reproduced flags FLG1, FLG2, FLG3 and FLG4 are at high "1" level, of the video and audio data 61p2, 62p2, 62p3 and 62p4 supplied to the FIFO memories 92-1, 92-2, 92-3 and 92-4, the video and audio data Dp11, Dp12, Dp13, Dp14, Dp15, Dp16, Dp17 and Dp18 are written in the FIFO memories 92-1, 92-2, 92-3 and 92-4.

The video and audio data 92I1, 92I2, 92I3 and 92I4 stored in the FIFO memories 92-1, 92-2, 92-3 and 92-4 are sequentially read out therefrom in response to the control signal from the read control circuit 94, and supplied to the bus 93 as video and audio data Dp11, Dp12, ..., Dp18.

Figure 16:
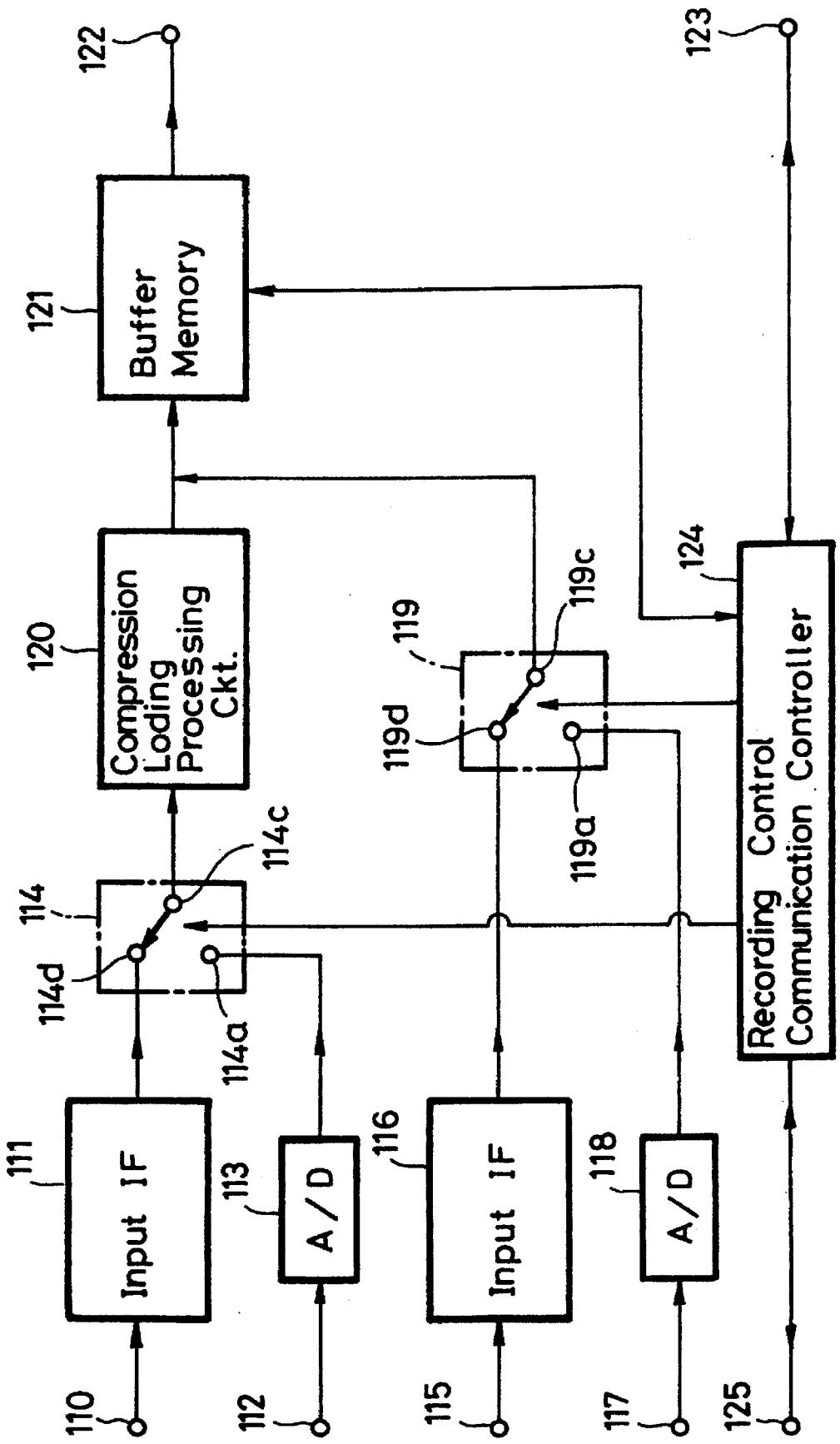
FIG. 16 is a block diagram showing an embodiment of the input interface circuit 24 shown in FIG. 2.

FIG. 16 shows an embodiment of the input interface circuit 24 shown in FIGS. 2 and 11.

The video special effect mixer 25 shown in FIG. 2, or an external source, supplies digital video data at a normal transfer rate such as 60 fields/second to input terminal 110, supplies analog video at a normal transfer rate to input terminal 112, supplies digital audio data at a normal transfer rate to input terminal 115, and supplies analog audio data at a normal transfer rate to input terminal 117.

The digital video data are applied to digital video data input interface circuit 111 which accepts various serial or parallel interface format, such as RS232C, RS422, SCSI and so forth, converts these formats to a common internal format, and supplies the converted data to fixed contact 114d of switch 114.

The analog video data are applied to A/D converter 113 which functions to convert the analog video signal into digital video data and to supply the digital data to fixed contact 114a of the switch 114.

The digital audio data are applied to digital audio data input interface circuit 116 which accepts various serial or parallel interface format, such as RS232C, RS422, SCSI and so forth, converts these formats to a common internal format, and supplies the converted data to fixed contact 119d of switch 119.

The analog audio data are applied to A/D converter 118 which functions to convert the analog audio signal into digital audio data and to supply the digital data to fixed contact 119a of the switch 119.

A movable contact 114c of the switch 114 is connected to an input terminal of a compression coding circuit 120, which is selected when the video data supplied thereto through the switch 114 is to be processed in a variable length coding fashion, such as DCT, quantization, run length coding, Huffman coding and processed in various compression processing, such as ADRC, wavelet transform or the like. If such compression is not needed, then the movable contact 114c of the switch 114 is connected to the buffer memory 121.

A movable contact 119c of the switch 119 is connected to an input terminal of a buffer memory 121.

While only the video data has been compression coded as described above, the audio data may similarly be compression coded.

Reference numeral 124 depicts a recording control communication controller. The recording control communication controller 124 generates switching signals based on the recording/reproducing control signal representing recording supplied thereto through an input and output terminal 125 from the control unit 27 shown in FIG. 2 and supplies the switching signals to the switches 114 and 119. The recording control communication controller 124 supplies a data recording control signal to the system controller 76 shown in FIG. 11. Further, the recording control communication controller 124 supplies a data buffering control signal to a buffer memory 121 to control the writing and reading of video and audio data supplied from the switches 114 and 119 to and from the buffer memory 121.

When digital video and audio data are supplied through the input terminals 110, 115, the switches 114, 119 connect the movable contacts 114c, 119c to fixed contacts 114d, 119d in response to the switching signal from the recording control communication controller 124. Video data from the input interface circuit 111 is then supplied through the switch 114 to the compression coding processor circuit 120, compression coded and then applied to the buffer memory 121. Audio data from the input interface circuit 116 is applied to the buffer memory 121 through the switch 119.

When analog video and audio data are supplied through the input terminals 112, 117, the switches 114, 119 connect the movable contacts 114c, 119c to fixed contacts 114a, 119a in response to the switching signal from the recording control communication controller 124. Video data from the A/D converter 113 is then supplied through the switch 114 to the compression coding processor circuit 120, compression coded and then applied to the buffer memory 121. Audio data from the A/D converter 118 is applied to the buffer memory 121 through the switch 119.

A data buffering control signal from the recording control communication controller 124 is supplied to the buffer memory 121, whereby video and audio data are sequentially written in the buffer memory 121. The video and audio data written in the buffer memory 121 are read out therefrom under the control of the data buffering control signal and then supplied through an output terminal 122 to the demultiplexer 75 shown in FIG. 11.

Because the buffer memory temporarily stores output information, a high speed transfer machine can be used to record the edited source even when conventional editing or special effects equipment is used to produce the edited source. Thus, the matching of data with different transfer rates can be made in the edit system.

Because the compression coding circuit is provided, the capacity of the buffer memory can be reduced and the transfer rate can be increased. Further, it is possible to minimize the capacity (storage capacity) of the unit information used in the high speed storage means. Therefore, in addition to the above-mentioned effects, it is possible to minimize the transfer rate and the storage capacity per unit information in the edit system.

Figure 17:
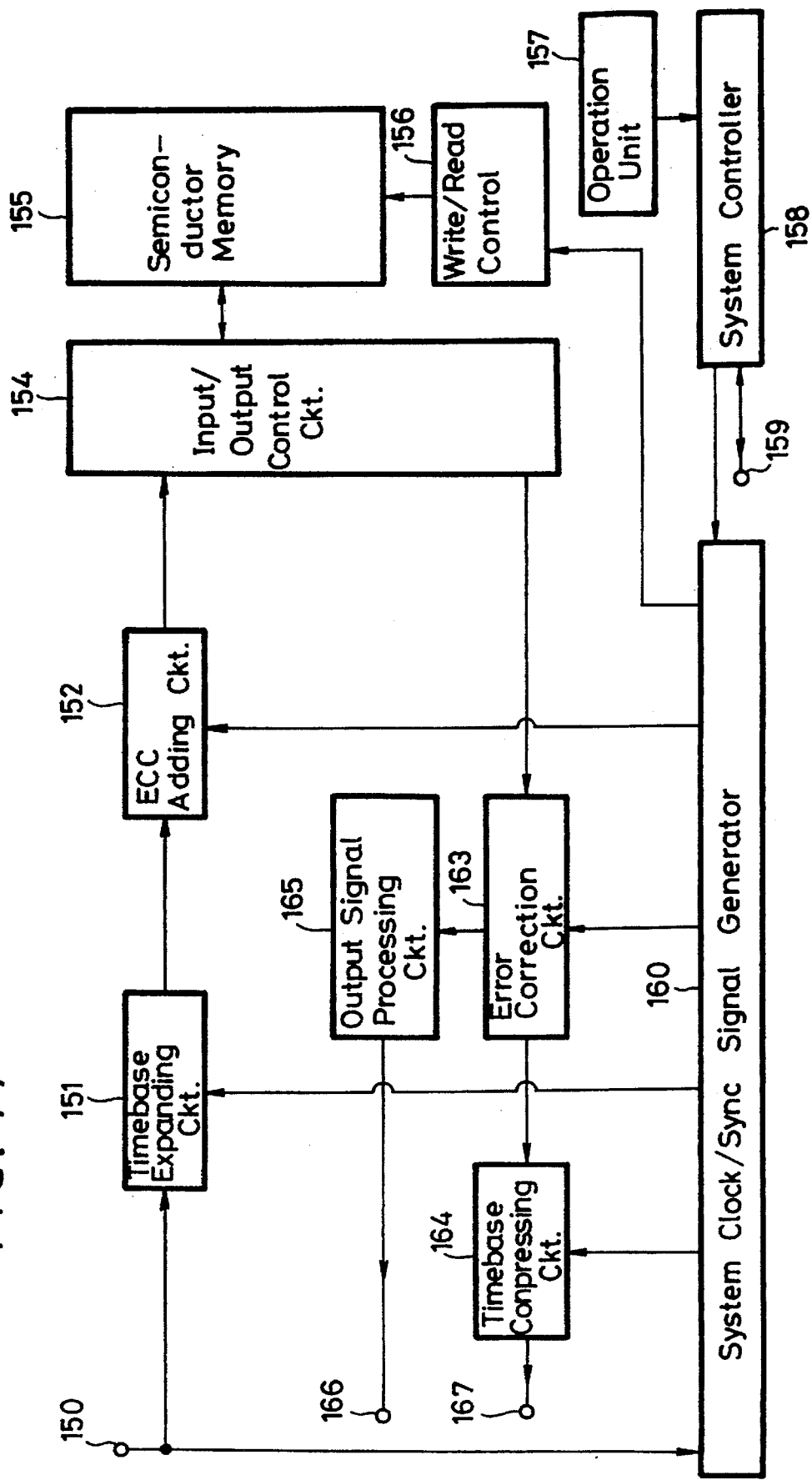
FIG. 17 is a block diagram showing another embodiment of an edit system according to the present invention.

FIG. 17 shows an embodiment of an edit system according to the present invention in which the high speed transfer machines 21 and 26 are formed of semiconductor memory devices. In this case, the video tape cassettes 20 and 29 shown in FIG. 2 are either card type memories or memory devices of large capacity disposed within the high speed transfer machines 21, 26.

In the example of FIG. 17, it is assumed that large storage capacity memories are disposed within the high speed transfer machines 21, 26. When the high speed transfer machine 21 incorporates a large storage capacity memory device, it is convenient to transmit video and audio data at high speed, that is, at n times the normal transfer rate, in a serial or parallel fashion.

Alternatively, the high speed transfer machine 21 can be considered to be formed of a semiconductor memory device and to be supplied with n times normal transfer rate video and audio data from a high speed transfer machine formed of some suitable means, such as a VTR or the like which comprise additional transfer equipment, so this arrangement is usually not preferred.

However, for example, in a broadcasting station, when a high speed transfer machine formed of a VTR is installed in a certain room and n times the normal transfer rate video and audio data from this high speed transfer machine are supplied to the high speed transfer machine 21 of the edit system shown in FIG. 2 that is installed in another room, then the high speed transfer machine 21 that is used to buffer video and audio data before such data are stored in the storage device 22 may be formed of a semiconductor memory device.

The high speed transfer machine 26 may conveniently be formed of a semiconductor memory device. Apart from the case when the video tape cassette needs a previously-edited medium, if the high speed transfer machine 26 is formed of the semiconductor memory device 26, then the high speed transfer machine 26 can be used as a transmission high speed transfer machine. Also, apart from the case when the card type memory needs a previously-edited medium, the high speed transfer machine 26 that is formed of the semiconductor memory device 26 can be used satisfactorily.

Input terminal 150 of FIG. 17 is operative to receive high speed, that is, n times normal transfer rate, video and audio data from the high speed transfer machine 21, from an external source, or from the storage device 22 when the high speed transfer machine 26 is used. Terminal 150 may alternatively receive video and audio data at a normal transfer rate is possible. Terminal 150 applies the data supplied thereto to timebase expander 151 and to system clock and sync signal generator 160.

The timebase expander 151 is used when video and audio data are provided at n times the normal transfer rate. The timebase expander 151 may be omitted when video and audio data are provided at the normal transfer rate. The timebase expander 151 serves to expand the timebase of the video and audio data supplied thereto, and to apply the timebase expanded video and audio data to an error correction code (ECC) adder 152 which functions to append ECC data to the expanded video and audio data and to supply the resulting data to input/output controller 154.

The input/output controller 154 includes an input/output circuit for supplying the video and audio data supplied thereto to a semiconductor memory 155, a compression coder and a decoder. The input/output circuit may be a table (memory) which holds data indicative of areas to store video and audio data at every field, at every frame or at every segment in the semiconductor memory 155 and a changeover circuit for switching the input/output direction. The compression coder may be a variable length coder, such as DCT, quantizer, Huffman coder, run length coder or a circuit which implements ADRC or wavelet transform. The decoder might be a circuit for decoding compression-coded video and audio data by carrying out inverse processing relative to that of the compression coder.

The semiconductor memory 155 is formed of SRAM (static RAM), DRAM (dynamic RAM), or EEPROM, and a battery backup circuit (including primary or secondary battery) for SRAM and DRAM. Write/read of the video and audio data to and from the semiconductor memory 155 is managed by write/read circuit 156 which is adapted to generate a write/read control signal based on a system clock/synchronizing signal from the system clock/ synchronizing signal generator 160 and to supply the write/read control signal to the semiconductor memory 155.

Operation unit 157 is adapted to instruct various operation contents, such as to reset data memorized in the semiconductor memory 155 and to write to and read from the semiconductor memory 155 in a manual fashion or the like.

System controller 158 functions to supply data indicative of operated contents to the system clock/synchronizing signal generator 160 based on the operation of the operation unit 157. The system controller 158 supplies a recording/reproducing control signal through an input and output terminal 159 to the control unit 27 shown in FIG. 2.

The video and audio data read out from the semiconductor memory 155 are expanded by the decoder, not shown, of the input and output circuit 154 and then supplied to an error correcting circuit 163 which corrects errors in the video and audio data and supplies the error corrected data to a timebase compressing circuit 164 and an output signal processor 165.

The output signal processor 165 processes the video and audio data supplied thereto to provide digital or analog video and audio signals at a rate of 60 fields/second when the video and audio data are in NTSC format, and outputs the processed digital or analog video and audio signals to output terminal 166.

The timebase compressing circuit 164 compresses the timebase of the video and audio data supplied thereto by reading the video and audio data at high speed, e.g., at n times the speed at which it was written to a memory of the circuit 164, and outputs the timebase-compressed video and audio data to an output terminal 167.

[0265]

The system clock/synchronizing signal generator 160 obtains a synchronizing signal from the video and audio data supplied thereto from the input terminal 150 and generates the system clock and the synchronizing signal. The system clock/synchronizing signal generator 160 supplies the resultant system clock and synchronizing signal to the timebase expanding circuit 151, the ECC adding circuit 152, the write/read circuit 156, the error correcting circuit 163, the timebase expanding circuit 164 and the output signal processor 165, respectively.

When the high speed transfer machine 26 shown in FIG. 2 is as shown in FIG. 17, the write/read speed of video and audio data in the high speed transfer machines 21, 26 can be realized by varying the timing of the write/read control signal generated by the write/read circuit 156. Therefore, while use of the timebase expanding circuit 151 and the timebase compressing circuit 164 is shown in FIG. 17, it is possible to realize the above-mentioned write/read speed without the timebase expanding circuit 151 and the timebase compressing circuit 164 by varying the timing of the write/read control signal generated from the write/read circuit 156. Moreover, the ECC adding circuit 152 and the error correcting circuit 163 may be omitted.

Figure 1:
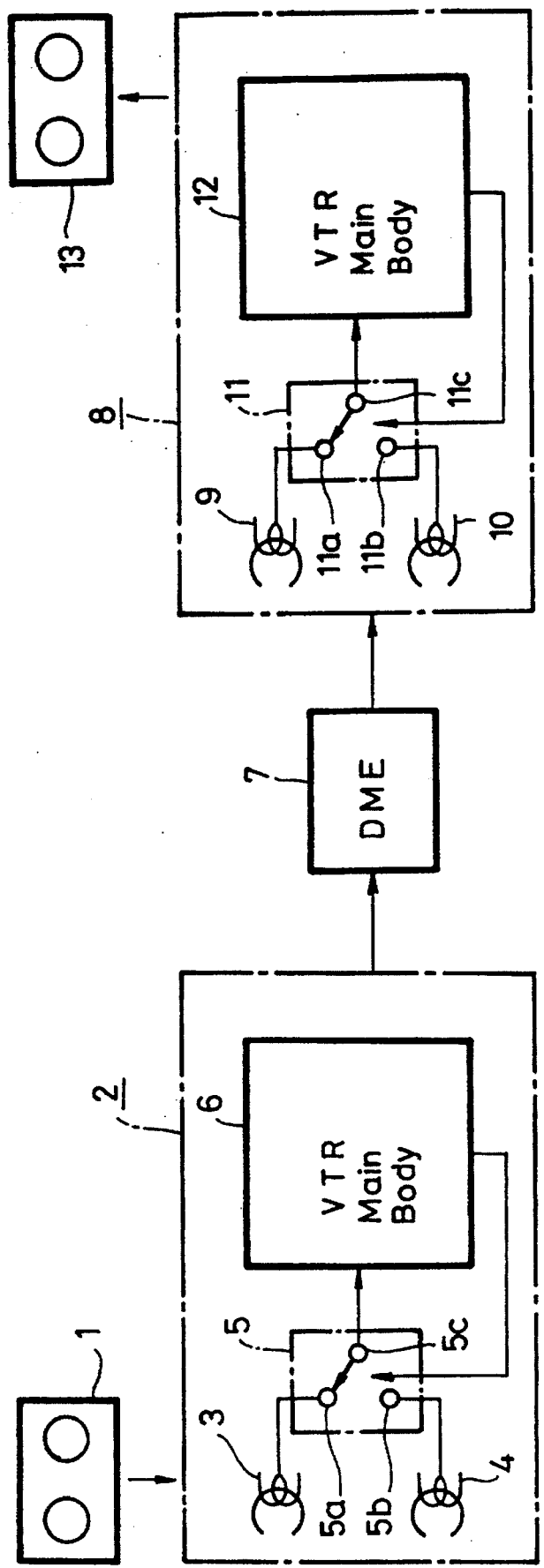
FIG. 1 is a block diagram showing an example of a conventional edit system.

As described above, if the high speed transfer machines 21, 26 shown in FIG. 1 are formed of semiconductor memory devices, the circuit arrangement and the processing can be simplified. Also, if such high speed transfer machines 21, 26 are used in the edit system, it is possible to further increase the processing speed.

While the high speed transfer machines 21 and 26 are formed of semiconductor memory apparatus as described above, if the video tape cassette that is now most popular as the video and audio data medium is changed to a large capacity card type memory (memory that needs no back-up, such as a RAM or the like or memory that needs no back-up, such as a flash memory), the present invention can cope with such change satisfactorily by forming the high speed transfer machines 21 and 26 as the card type memory drives and the recording medium as the card type memory.

Other variations are also is possible wherein the high speed transfer machines 21, 26 include optical disc drives for magneto-optical discs, write-once optical discs, optical discs as a phase-change medium, etc., and hard disc drives for magnetic discs.

The high speed transfer machines 21, 26 can be formed of a plurality of drives when there are provided a plurality of heads in response to necessary transfer rates for one disc, there are provided a plurality of systems for processing reproduced data from the plurality of heads and a plurality of systems for processing a plurality of data to be recorded or there are provided one or a plurality of heads in response to necessary transfer rates for a plurality of discs and a plurality of signal processing circuits for processing recorded and reproduced data.

Advantages obtained when the medium is the disc are that the disc can be accessed with ease at high speed so that the operator can start the edit again with ease and that the operator can search necessary source with ease. Further, when the high speed transfer machine 21 includes a disc drive, it is possible to also use the high speed transfer machine 21 as the storage device 22 by using a format in which one disc is divided to provide a plurality of areas in use or a format in which a plurality of discs are used as individual areas (e.g., medium, such as hard disc using a plurality of discs).

Because the high speed reproducing unit and the high speed storage unit may be formed as one device, it is possible to reduce the size of the edit system.

Because the write/read control means supplies the write control signal to the semiconductor memory unit when input information is stored therein, it is possible to reproduce, transfer, store and process video and audio data at high speed.

While the video and audio data are the NTSC video and audio data as described above, the present invention is not limited thereto and PAL video and audio data, SECAM video and audio data or high definition television video and audio data can be realized by properly setting a variety of parameters in respective elements, such as a frequency of a system clock, the number of recording/reproducing heads 38-1 to 38-2n and the rotational speed of the rotary drum or the like. Of course, when the video and audio data are high definition television audio and video data, it is possible to increase the transfer rate by using compressing coding and compressing decoding.

Although illustrative embodiments of the present invention, and various modifications thereof, have been described in detail herein with reference to the accompanying drawings, it is to be understood that the invention is not limited to these precise embodiments and the described modifications, and that various changes and further modifications may be effected therein by one skilled in the art without departing from the scope or spirit of the invention as defined in the appended claims.

What is claimed is:

1. An edit system for editing information on a plurality of recording media previously recorded at a first normal rate, comprising:

means for reproducing said information from said plurality of recording media at a second rate, which is n times higher than the first normal rate to provide edit information and wherein n is an integral number greater than 1;

means for storing the edit information at the second rate to provide stored edit information;

means for reading the stored edit information at the first normal rate to provide read information;

processing means for processing the stored edit information read from said means for storing to generate processed information and wherein said means for storing is operable to store the processed information at the first normal rate;

means for operating said means for reading to read the processed information at the second rate from said means for storing; and means for transferring the processed information read by said means for reading to a destination at the second rate.

2. The edit system of claim 1, wherein means for reproducing is contained within a high speed video tape recorder (VTR) having a plurality of heads for at least reproducing; and wherein each of said plurality of recording media is a video tape cassette.

3. The edit system of claim 2, wherein hd=xn, and x is the number of heads to obtain a normal transfer rate, n is a magnification factor of a normal tape transport speed, d is a magnification factor of a normal rotary drum rotational speed, and h is the number of heads actually used.

4. The edit system of claim 3, wherein d is in the range 1/n to n.

5. The edit system of claim 2, wherein said high speed VTR is operative to reproduce said information from said plurality of recording media at the second rate, at the first normal rate and at 1/n times the first normal rate.

6. The edit system of claim 2, wherein said means for transferring includes means for recording on a video tape cassette and said means for recording is contained within another high speed VTR.

7. The edit system of claim 2, wherein the high speed VTR includes:
   extracting means for extracting data from each of said plurality of recording media at the second rate to provide extracted data;
   channel decoding means for decoding the extracted data to provide decoded data;
   error correction means for correcting errors in the decoded data to provide error corrected data;
   timebase compressing means for compressing the timebase of the error corrected data; and
   multiplexing means for combining the error corrected data associated with each of said plurality of recording media to generate said edit information.

8. The edit system of claim 2, wherein said means for transferring includes means for recording said processed information on a video tape cassette and said means for recording is contained within the high speed VTR, and the high speed VTR includes:
   error correction code means for generating error correction codes as a function of the processed information; and
   channel coding means for modulating the processed information and error correction codes.

9. The edit system of claim 8, wherein the high speed VTR further includes:
   demultiplexing means for segmenting the processed information into a plurality of streams of processed information;
   timebase expanding means for expanding the timebase of the streams of processed information to generate expanded streams of processed information; and wherein said means for recording is operable to record the expanded streams of processed information.

10. The edit system of claim 1, wherein said means for storing includes a semiconductor memory; means for writing to the semiconductor memory the edit information at the second rate and said processed information at the first normal rate; and means for reading from the semiconductor memory the stored edit information at the first normal rate and the processed information the second rate.

11. The edit system of claim 10, further comprising timebase expanding means for expanding the timebase of the processed informations read from said semiconductor memory, and timebase compressing means for compressing the timebase of the reproduced information prior to being written to said semiconductor memory.

12. The edit system of claim 1, wherein the means for reading includes means for converting the rate of the edit information from the second rate to the first normal rate and the processed information from the first normal rate to the second rate.

13. The edit system of claim 1, further comprising means for compressing and coding the processed information prior to being stored by said means for storing.

14. The edit system of claim 1, wherein the processing means includes buffer means for temporary storing the processed information.

15. The edit system of claim 1, wherein said means for storing includes at least one optical disc.

16. The edit system of claim 1, wherein said means for storing includes at least one magneto-optical disc.

17. The edit system of claim 1, wherein said means for storing includes at least one hard disc.

18. The edit system of claim 1, wherein said means for storing includes at least one flexible disc.

19. The edit system of claim 13, further comprising means for decompressing and decoding the stored edit information prior to being processed by said processing means.

20. An edit system for editing information on a plurality of recording media previously recorded at a first normal rate, comprising:
   means for reproducing said information from said plurality of recording media at a second rate, which is n times higher than the first normal rate to provide edit information and wherein n is an integral number greater than 1;
   first demultiplexer means for segmenting the edit information reproduced from said plurality of recording media at said second rate into a plurality of streams of edit information;
   means for storing comprising a first storage area and a second storage area, and wherein said means for storing is operable to store the plurality of streams of edit information in said first storage area;
   means for reading the plurality of streams of edit information from said first storage area at the first normal rate;
   processing means for processing the plurality of streams of edit information read from said means for storing to generate processed information;
   second demultiplexer means for segmenting the processed information into a plurality of streams of processed information and storing the plurality of streams of processed information in said second storage area at the first normal rate;
   means for operating said means for reading to read the plurality of streams of processed information from said second storage area at the first normal rate;
   multiplexer means for combining the plurality of streams of processed information read by said means for reading to produce a combined stream; and
   means for transferring the combined stream to a destination at the second rate.

21. The edit system of claim 20, whereon the first and second storage areas are formed from one of at least one optical disc, at least one magneto-optical disc, at least one hard disc, at least one silicon disc and at least one flexible disc having a recording capacity of at least 20 MBytes.

22. The edit system of claim 20, wherein said means for reading includes matrix switch means for selectively reading from said first storage area and said second storage area.

23. The edit system of claim 22, further comprising a plurality of buses having a cardinality equal to the cardinality of said plurality of streams of information.

24. An editing method for editing information on a plurality of recording media previously recorded at a first normal rate, comprising the steps of:

reproducing said information from said plurality of recording media at a second rate, which is n times higher than the first normal rate to provide reproduced information and wherein n is an integral number greater than 1;

storing the reproduced information at the second rate to provide stored information;

reading the stored information at the first normal rate to provide read information;

processing the read information to generate processed information;

storing the processed information at the first normal rate;

reading the processed information at the second rate to provide read processed information; and transferring the read processed information to a destination at the second rate.

25. The editing method of claim 24, wherein the step of storing the reproduced information includes segmenting the reproduced information into a plurality of streams of information; and storing the plurality of streams of information at the second rate.

26. The editing method of claim 24, wherein the step of storing the processed information includes segmenting the processed information into a plurality of streams of processed information and storing the plurality of streams of processed information at the first rate.

27. The editing method of claim 26, wherein the step of transferring the read processed information includes combining the read plurality of streams of processed information to generate a combined stream and transferring said combined stream to the destination at the second rate.

* * * * *